(12) United States Patent
Creager et al.

(10) Patent No.: US 10,049,367 B2
(45) Date of Patent: Aug. 14, 2018

(54) PRODUCT COMPLIANCE FULFILLMENT PORTAL SYSTEM AND METHOD

(71) Applicant: General Electric Company, Schenectady, NY (US)

(72) Inventors: David Wayne Creager, Longmont, CO (US); Sreenivasu Mylavarapu, Marthahalli Village (IN); Mark Jonathan Klawin, Loveland, CO (US); Troy Gilchrist Wojick, Broomfield, CO (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 14/498,579

(22) Filed: Sep. 26, 2014

(65) Prior Publication Data
US 2016/0092885 A1    Mar. 31, 2016

(51) Int. Cl.
*G06Q 30/00* (2012.01)
*H04L 29/06* (2006.01)
*G06Q 30/06* (2012.01)

(52) U.S. Cl.
CPC .......... *G06Q 30/018* (2013.01); *G06Q 30/06* (2013.01); *G06Q 30/0635* (2013.01); *H04L 67/42* (2013.01)

(58) Field of Classification Search
CPC ...................................... G06Q 30/06
See application file for complete search history.

(56) References Cited

U.S. PATENT DOCUMENTS

| 2008/0172270 A1* | 7/2008 | Eckenroth | G06Q 10/08 705/311 |
| 2011/0252038 A1* | 10/2011 | Schmidt | G06F 8/60 707/741 |

(Continued)

FOREIGN PATENT DOCUMENTS

WO    9930265 A1    6/1999

OTHER PUBLICATIONS

PCT Search Report and Written Opinion issued in connection with corresponding PCT Application No. PCT/US2015/044539 dated Oct. 19, 2015.

(Continued)

*Primary Examiner* — Mila Airapetian
(74) *Attorney, Agent, or Firm* — Mintz Levin Cohn Ferris Glovsky and Popeo, P.C.

(57) ABSTRACT

One embodiment may include a non-transitory, computer-readable medium that store instructions configured to cause a processor to execute, via a server configured to communicate within a client-server network, a product compliance fulfillment portal. The product compliance fulfillment portal may include a product compliance evaluation (PCE) tool, a product baseline compliance specification (PBCS) tool, and a transactional compliance plan (TCP) tool. The PCE tool may be configured to add compliance requirements for a product in a territory, the PBCS tool may be configured to identify compliance requirements for the product in the territory and assign a compliance status in the territory, and the TCP tool may be configured to receive a customer order incoming via a computing client communicatively coupled to the server, the customer order including products and a desired territory as input and to derive a compliance plan specifying fulfillment instructions to fulfill the customer order.

20 Claims, 25 Drawing Sheets

(56) References Cited

U.S. PATENT DOCUMENTS

| | | | |
|---|---|---|---|
| 2012/0078805 A1* | 3/2012 | Monz-Schneider | G06Q 10/0831 705/331 |
| 2012/0158602 A1 | 6/2012 | Dolan et al. | |
| 2013/0080293 A1* | 3/2013 | Khin | G06Q 30/06 705/26.81 |
| 2013/0103598 A1* | 4/2013 | Peterson | G06Q 10/10 705/317 |
| 2014/0019183 A1* | 1/2014 | Zeng | G06O 10/06 705/7.19 |
| 2014/0279221 A1* | 9/2014 | Woodward | G06Q 30/0607 705/26.25 |
| 2014/0310230 A1* | 10/2014 | Cinelli | G06Q 10/06 706/52 |

OTHER PUBLICATIONS

"Implement a Sustainable Compliance Management Program"; Datasheet Compliance Management; MetricStream; 2015; 2 pages.

* cited by examiner

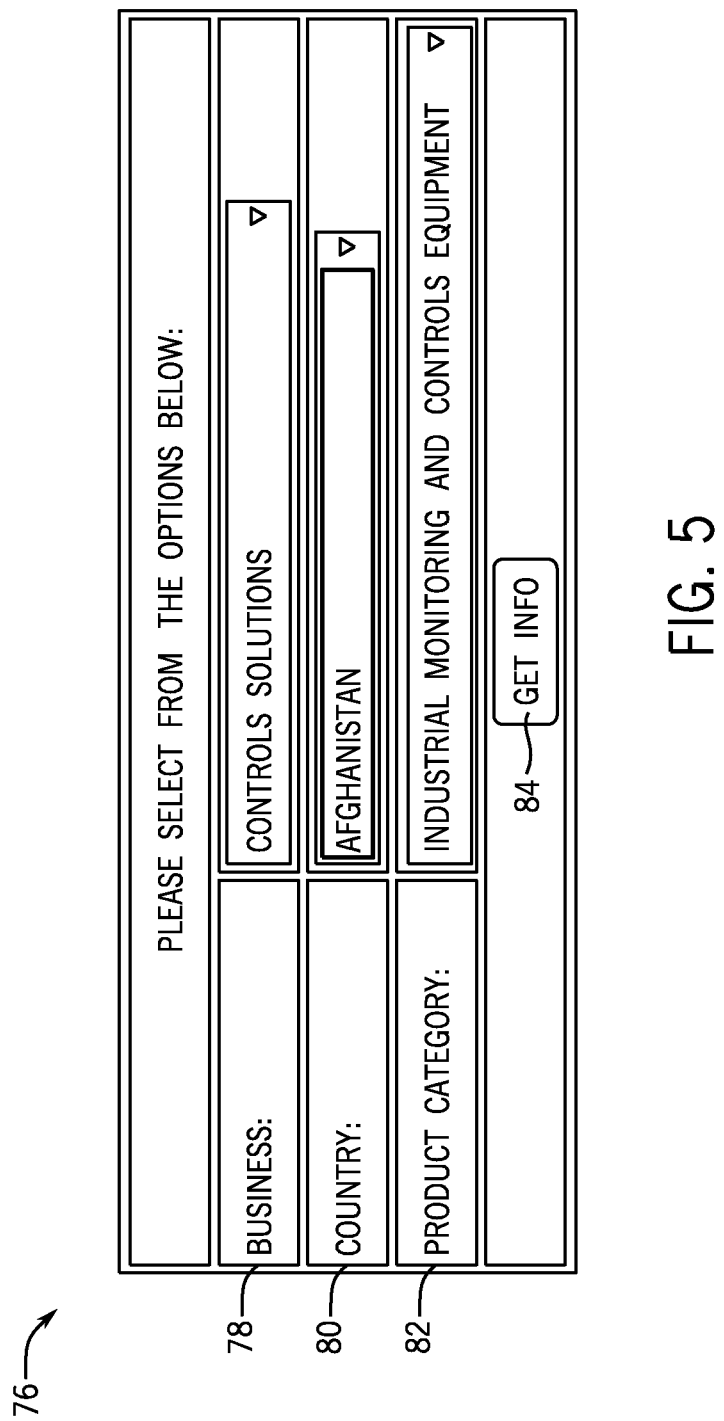

| BUSINESS | PRODUCT CATEGORY 96 | PRODUCT 98 | MEMBER COUNTRY 100 | COUNTRY 102 | REGULATION CATEGORY 104 | REGULATION 106 | COMMENTS 108 | REGULATION STATUS 110 | REGULATION SUPERSEDED BY | RESEARCH SOURCE 112 | APPLICABILITY 114 | APPROVER 116 | STANDARD 118 | COMMENTS | STANDARD STATUS 120 |
|---|---|---|---|---|---|---|---|---|---|---|---|---|---|---|---|
| CONTROLS | INDUSTRIAL MONITORING AND CONTROL EQUIPMENT | INDUSTRIAL CABINETS- GENERATOR PROTECTION PANEL (GPP) | GULF COOPERATION COUNCIL | BAHRAIN | ELECTRICAL PRODUCT SAFETY | NONE KNOWN AT THIS TIME, BUT IT IS BEST PRACTICE TO SHIP PRODUCTS COMPLAINT WITH IEC | | CURRENT | 0 | ONSPEC | VOLUNTARY | 12/29/2011 DWE | NONE MANDATORY EXCEPT FOR SOME HOUSE HOLD PRODUCTS IEC ASSOCIATE MEMBER- UL OR CE CERTIFICATION SHOULD BE USED AS A DEFAULT USE EX DOC AS ALTERNATE PROOF OF CONFORMITY. | | |
| CONTROLS | INDUSTRIAL MONITORING AND CONTROL EQUIPMENT | INDUSTRIAL CABINETS-MK V TO MK VIE MIGRATION | GULF COOPERATION COUNCIL | BAHRAIN | ELECTRICAL PRODUCT SAFETY | NONE KNOWN AT THIS TIME, BUT IT IS BEST PRACTICE TO SHIP PRODUCTS COMPLAINT WITH IEC | | CURRENT | 0 | ONSPEC | VOLUNTARY | 12/29/2011 DWE | NONE MANDATORY EXCEPT FOR SOME HOUSE HOLD PRODUCTS IEC ASSOCIATE MEMBER- UL OR CE CERTIFICATION SHOULD BE USED AS A DEFAULT USE EX DOC AS ALTERNATE PROOF OF CONFORMITY. | | |
| CONTROLS | INDUSTRIAL MONITORING AND CONTROL EQUIPMENT | INDUSTRIAL CABINETS-MK V TO MK VIE MIGRATION | GULF COOPERATION COUNCIL | BAHRAIN | ELECTRICAL PRODUCT SAFETY | NONE KNOWN AT THIS TIME, BUT IT IS BEST PRACTICE TO SHIP PRODUCTS COMPLAINT WITH IEC | | CURRENT | 0 | ONSPEC | VOLUNTARY | 12/29/2011 DWE | NONE MANDATORY EXCEPT FOR SOME HOUSE HOLD PRODUCTS IEC ASSOCIATE MEMBER- UL OR CE CERTIFICATION SHOULD BE USED AS A DEFAULT USE EX DOC AS ALTERNATE PROOF OF CONFORMITY. | | |

FIG. 6

PBCS SEARCH RESULTS
EXCITATION-PRODUCT A:ALL COUNTRIES

| TITLE BLOCK | REVISION HISTORY | TARGET COMPLIANCE | REGULATIONS AND STANDARDS | PRODUCT SCOPE | COST AND SCHEDULE | MARKING AND LABELING | QUALITY RECORDS | PACKAGING AND SHIPPING | CUSTOMER INSTALLATION | LANGUAGE | QUALITY CONTROLS | TECHNICAL FILES |

TITLE BLOCK

TECH TRS*: DAVE CREAGER
QUALITY REPRESENTATIVE*: MARK KLAWIN
PROCESS OWNER*: TROY WOJICK
ITO COMMERCIAL*: ROBIN SMITH
DATE OF REVIEW COUNCIL MEETING*: —
APPROVAL WORKFLOW NUMBER*: —

START OVER

[PRINT THIS PAGE]

FIG. 10

PBCS SEARCH RESULTS
EXCITATION-PRODUCT A:ALL COUNTRIES

| TITLE BLOCK | REVISION HISTORY | TARGET COMPLIANCE | REGULATIONS AND STANDARDS | PRODUCT SCOPE | COST AND SCHEDULE | MARKING AND LABELING | QUALITY RECORDS | PACKAGING AND SHIPPING | CUSTOMER INSTALLATION | LANGUAGE | QUALITY CONTROLS | TECHNICAL FILES |

REVISION HISTORY

| REVISION NUMBER | DATE | AUTHOR | DESCRIPTION OF CHANGE |
|---|---|---|---|
| — | 2/22/2012 | BRAD MCCLELLAND | INITIAL ISSUE |
| A | 5/22/2013 | DAVID CREAGER | UPDATING COMPLIANCE INFORMATION—NO EMC PERFORMED—PRODUCT CAN NOT BE OFFERED UNTIL |

FIG. 11

PBCS SEARCH RESULTS
EXCITATION–PRODUCT A:ALL COUNTRIES

| TITLE BLOCK | REVISION HISTORY | TARGET COMPLIANCE | REGULATIONS AND STANDARDS | PRODUCT SCOPE | COST AND SCHEDULE | MARKING AND LABELING | QUALITY RECORDS | PACKAGING AND SHIPPING | CUSTOMER INSTALLATION | LANGUAGE | QUALITY CONTROLS | TECHNICAL FILES |
|---|---|---|---|---|---|---|---|---|---|---|---|---|

TARGET COMPLIANCE

| COUNTRY | MEMBER COUNTRY | | | | | |
|---|---|---|---|---|---|---|
| AFGHANISTAN | | NON HAZARDOUS | | | HAZARDOUS | |
| ALGERIA | | NEEDS EVALUATION | | | NEEDS EVALUATION | |
| ANGOLA | | NEEDS EVALUATION | | | NEEDS EVALUATION | |
| ARGENTINA | | NEEDS EVALUATION | | | NEEDS EVALUATION | |
| ARMENIA | RUSSIAN FEDERATION | DOES NOT COMPLY | | | NEEDS EVALUATION | |
| ARUBA | | NEEDS EVALUATION | | | NEEDS EVALUATION | |
| AUSTRALIA | | NEEDS EVALUATION | | | NEEDS EVALUATION | |
| AUSTRIA | EU MEMBER | DOES NOT COMPLY | | | NEEDS EVALUATION | |
| AZERBAIJAN | RUSSIAN FEDERATION | DOES NOT COMPLY | | | NEEDS EVALUATION | |
| BAHAMAS | | NEEDS EVALUATION | | | NEEDS EVALUATION | |
| BAHRAIN | GULF COOPERATION COUNCIL | NEEDS EVALUATION | | | NEEDS EVALUATION | |
| BANGLADESH | | NEEDS EVALUATION | | | NEEDS EVALUATION | |
| BELARUS | RUSSIAN FEDERATION | NEEDS EVALUATION | | | NEEDS EVALUATION | |
| BELGIUM | RU MEMBER | DOES NOT COMPLY | | | NEEDS EVALUATION | |
| BELIZE | | NEEDS EVALUATION | | | NEEDS EVALUATION | |
| BENIN | | NEEDS EVALUATION | | | NEEDS EVALUATION | |
| BERMUDA | | NEEDS EVALUATION | | | NEEDS EVALUATION | |
| BOLIVIA | | NEEDS EVALUATION | | | NEEDS EVALUATION | |
| BOTSWANA | | NEEDS EVALUATION | | | NEEDS EVALUATION | |
| BRAZIL | | NEEDS EVALUATION | | | NEEDS EVALUATION | |

PBCS SEARCH RESULTS
EXCITATION-PRODUCT A:ALL COUNTRIES

| TITLE BLOCK | REVISION HISTORY | TARGET COMPLIANCE | REGULATIONS AND STANDARDS | PRODUCT SCOPE | COST AND SCHEDULE | MARKING AND LABELING | QUALITY RECORDS | PACKAGING AND SHIPPING | CUSTOMER INSTALLATION | LANGUAGE | QUALITY CONTROLS | TECHNICAL FILES |
|---|---|---|---|---|---|---|---|---|---|---|---|---|

SEARCH RESULTS: 1053
PAGES: 1 2 3 4 5 6 7 8 9 10 11

REGULATIONS AND STANDARDS

| COUNTRY | STATE | REGULATORY CATEGORY | TECHNICAL REGULATION | SEVERITY | STANDARD | COMPLIANCE | CONFORMITY ASSESSMENT |
|---|---|---|---|---|---|---|---|
| ALGERIA | | ELECTRICAL PRODUCT SAFETY | LAW 09-03 DATED 25/02/2009 AND THE DECREE 05-467 DATED 12/12/2005 | MANDATORY | IANOR STANDARDS IEC OR EN STANDARDS MAY BE USED | NEEDS EVALUATION | |
| ANGOLA | | ELECTRICAL PRODUCT SAFETY | NO CURRENT REGULATION PERTAINING TO THE EQUIPMENT | | IANORQ STANDARDS ARE CURRENTLY BEING HARMONIZED WITH IEC ACCEPTABLE. | NEEDS EVALUATION | |
| ARGENTINA | | ELECTRICAL PRODUCT SAFETY | NOT IN SCOPE OF ARGENTINE RESOLUTION 92/98. | | IEC BASED TEST REPORTS ARE ACCEPTABLE. | NEEDS EVALUATION | |
| ARGENTINA | | ELECTRICAL PRODUCT SAFETY | S-MARK-92/98 | MANDATORY | MARK VIE OR OC 6000/4000 NOT INSCOPE-BUT ANY DCS SYSTEM WITH HMI, COMPUTER MONITORS,OR OTHER COMPUTER EQUIPMENT MUST BE EVALUATED FOR SCOPE | NEEDS EVALUATION | |
| ARMENIA | | ELECTRICAL PRODUCT SAFETY | GOST FOR BOTH SAFETY AND EMC CERTIFICATION. TR 347-FZ | MANDATORY | CE FOR LND AND EMX CAN BE USED TO PROVE AFTER 1/1/2012 | NEEDS EVALUATION | |

FIG. 21

TCP SEARCH RESULTS
SALESFORCE.COM NUMBER:SF_TEST_FOR_TUTORIAL
PROJECT NUMBER:

| ENTER GENERAL TCP INFORMATION | ENTER PROJECT INFORMATION | FIND ITO COMPLIANCE CHECK (FOLLOW-UP ACTIONS) | FIND COMPLIANCE REQUIREMENTS (COST & CYCLE ADDERS) —308 |
|---|---|---|---|

300 ⟶

310
COUNTRY:AUSTRIA
BUSINESS:CONTROLS

GO TO LOG IN SCREEN (DO NOT USE BACK BUTTON)
FOR DETAILED INSTRUCTION CLICK HERE
COMPLIANCE REQUIREMENTS 316
314

| COMPLIANCE STATUS | PRODUCT | REGULATION CATEGORY | REGULATION | PLAN OF COMPLIANCE | REGULATION APPLICABILITY | STANDARD | STANDARD APPLICABILITY | COST TO COMPLY | CYCLE TO COMPLY | COMMENTS TO COMPLIANCE |
|---|---|---|---|---|---|---|---|---|---|---|
| CAN COMPLY-CHECK FOR COST AND CYCLE | INDUSTRIAL CABINETS-MK VLE | HAZARDOUS LOCATIONS | 9 4/9 EC ATEX DIRECTIVE | INTRINSICALLY SAFE CONFIGURATION FOR FEEING A HAZARDOUS AREA. EXPLOSIVE ATMOSPHERE GENERAL REQUIREMENTS | MANDATORY | EN/IEC 60079 SERIES (DEPENDING ON THE HAZARDOUS ZONE) | | $15,000 | 5 DAYS | INSPECTION-AFTER PRODUCT IS CONSTRUCTED, IF THIRD PARTY INSPECTOR IS NEEDED |
| CAN COMPLY-CHECK FOR COST AND CYCLE | INDUSTRIAL CABINETS-MK VLE | HAZARDOUS LOCATIONS | 9 4/9 EC ATEX DIRECTIVE | INTRINSICALLY SAFE CONFIGURATION FOR FEEING A HAZARDOUS AREA. EXPLOSIVE ATMOSPHERE GENERAL REQUIREMENTS | MANDATORY | EN/IEC 60079 SERIES (DEPENDING ON THE HAZARDOUS ZONE) | | $15,000 | 5 DAYS | INSPECTION-AFTER PRODUCT IS CONSTRUCTED, IF THIRD PARTY INSPECTOR IS NEEDED |
| | INDUSTRIAL CABINETS-MK VLE | EMC | 2004/108/EC ELECTROMAGNETIC COMPATIBILITY | SEE TECHNICAL CONSTRUCTION FILE | MANDATORY | IEC/EN 6100-3-2 HARMONIC CURRENT CONDUCTED EMISSION | | $15,000 | 0 WEEKS | |

312  318  320  322  324  326  328  330  332

M&C TRS PRODUCT MATRIX

GO TO THE SEARCH PAGE

[CONTROLS SOLUTIONS] [USA] [EXCITATION-PRODUCT A]

| REGULATIONS | STANDARDS | COMPLIES STATUS |
|---|---|---|
| 29 CFR PART 1910 SUBPARTS | NONE | NOT APPLICABLE |
| PUBLIC LAW 104-142 MERCURY-CONTAINING AND RECHARGEABLE BATTERY MANAGEMENT ACT | NONE | NOT APPLICABLE |
| TOXICS IN PACKAGING PREVENTION ACT | NONE | NOT APPLICABLE |
| FCC 47 PART 15:2008 CLASS A | NONE | NOT APPLICABLE |
| PROPOSITION 65: A DECLARATION (WARNING) MAY NEED TO BE MADE IF THE PRODUCT CONTAINS OR PRODUCES CERTAIN SUBSTANCES. | UL 508, INDUSTRIAL CONTROL EQUIPMENT. CSA /ISA 61010-1 | NOT APPLICABLE |
| UBC SECTION 2312, ZONE 4 | UBC SECTION 2312, ZONE 4 | |
| IBC SECTION 1613, CLASS E | IBC SECTION 1613, CLASS 3 | |

[PRINT THIS PAGE]

NOTE: IF YOUR COUNTRY OR PRODUCT TYPE IS NOT LISTED, CLICK HERE TO OPEN A TRS HELP TICKET

KEY TO COMPLIANCE

COMPLIES — OK TO PROCEED
CAN COMPLY — SEE COST AND CYCLE ADDER
NEEDS EVALUATION — OPEN TRS HELP TICKET
DOES NOT COMPLY — DO NOT QUOTE AND CONTACT PLATFORM TEAM FOR DIRECTION

FIG. 25

PRODUCT COMPLIANCE FULFILLMENT PORTAL SYSTEM AND METHOD

BACKGROUND

The subject matter disclosed herein relates to a product compliance fulfillment portal, and more particularly, to an online product compliance fulfillment portal that enables researching and managing product compliance in territories between businesses.

Territories, including countries, states, municipalities, sales regions, and so forth, may have regulations and standards that products must satisfy to be imported, distributed, sold, and the like. Entities that do business in these territories need to be aware of the requirements for the various products they intend to ship, distribute, and/or sell, and the entities need to verify whether their products are compliant with the territory's requirements. Further, one or more businesses within a particular entity may work with similar product types. Each business may maintain its own spreadsheet, document, or independent tool with data related to the regulations and standards required for the similar product to be shipped and/or sold in one or more territories. Thus, when a business desires to ship the like product type into the territories, that business may search a plurality of disparate document types, including spreadsheets, text documents, and the like, to identify the current regulations and standards. Also, the business may have to sort through the different resources (e.g., governmental database) to determine whether the product is compliant in the desired territory and, if not, how to make the product compliant. Searching may take up a great deal of time and delay a response to a customer on whether the business can fulfill the customer's order.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the present disclosure. Indeed, the disclosed techniques may encompass a variety of forms that may be similar to or different from the embodiments set forth below.

In a first embodiment, a non-transitory, computer-readable medium having instructions stored thereon is disclosed. The instructions may be configured to execute, via a server configured to communicate within a client-server network, a product compliance fulfillment portal, the product compliance fulfillment portal may include a product compliance evaluation (PCE) tool, a product baseline compliance specification (PBCS) tool, and a transactional compliance plan (TCP) tool. The PCE tool may be configured to add compliance requirements for a product in a territory. The instructions may be further configured to execute, via the server, the PBCS tool, where the PBCS tool is configured to identify compliance requirements for the product in the territory and to assign a compliance status in the territory, and to execute, via the server, the TCP tool, where the TCP tool is configured to receive a customer order incoming via a computing client communicatively coupled to the server, the customer order including a plurality of products and a desired territory as input and to derive a compliance plan specifying fulfillment instructions to fulfill the customer order.

In a second embodiment, a method may include adapting a product compliance server by uploading data relating to product compliance and product baseline compliance specifications into a database repository, executing, via a processor included in the product compliance server, a product compliance fulfillment portal, the product compliance fulfillment portal may include a product compliance evaluation (PCE) tool, a product baseline compliance specification (PBCS) tool, and a transactional compliance plan (TCP) tool, where the PCE tool may be configured to add compliance requirements for a product in a territory. The method may further include executing, via the processor, the PBCS tool, where the PBCS tool may be configured to specify compliance requirements for the product in the territory and assign a compliance status in the territory, and the method may include executing, via the processor, the TCP tool, where the TCP tool may be configured to receive a customer order incoming via a computing client communicatively coupled to the server, the customer order including a plurality of products and a desired territory as input, and to derive a compliance plan specifying fulfillment instructions to fulfill the customer order.

In a third embodiment, a system may include a physical processor included in a product compliance server configured to execute a product compliance fulfillment portal. The product compliance fulfillment portal may include a product compliance evaluation (PCE) tool, a product baseline compliance specification (PBCS) tool, and a transactional compliance plan (TCP) tool, where the PCE tool may be configured to add compliance requirements for a product in a territory. The physical processor may also be configured to execute the PBCS tool, where the PBCS tool may be configured to identify compliance requirements for the product in the territory and assign a compliance status in the territory, and to execute the TCP tool, wherein the TCP tool is configured to receive a customer order incoming via a computing client communicatively coupled to the server, the customer order including a plurality of products and a desired territory as input and to derive a compliance plan specifying fulfillment instructions to fulfill the customer order.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 illustrates a search tool screen provided by the PCE tool, in accordance with an embodiment;

FIG. 6 illustrates a search results screen provided by the PCE tool of FIG. 5, in accordance with an embodiment;

FIG. 10 illustrates a search results screen provided by the PBCS tool where the "Title Block" tab is selected, in accordance with an embodiment;

FIG. 11 illustrates a search results screen provided by the PBCS tool where the "Revision History" tab is selected, in accordance with an embodiment;

FIG. 12 illustrates a search results screen provided by the PBCS tool where the "Target Compliance" tab is selected, in accordance with an embodiment;

FIG. 13 illustrates a search results screen provided by the PBCS tool where the "Regulations and Standards" tab is selected, in accordance with an embodiment;

FIG. 21 illustrates a compliance requirements tool screen provided by the TCP tool that may display cost and cycle to comply, in accordance with an embodiment;

FIG. 25 illustrates a search results screen provided by the product matrix tool, in accordance with an embodiment.

DETAILED DESCRIPTION

Figure 1:
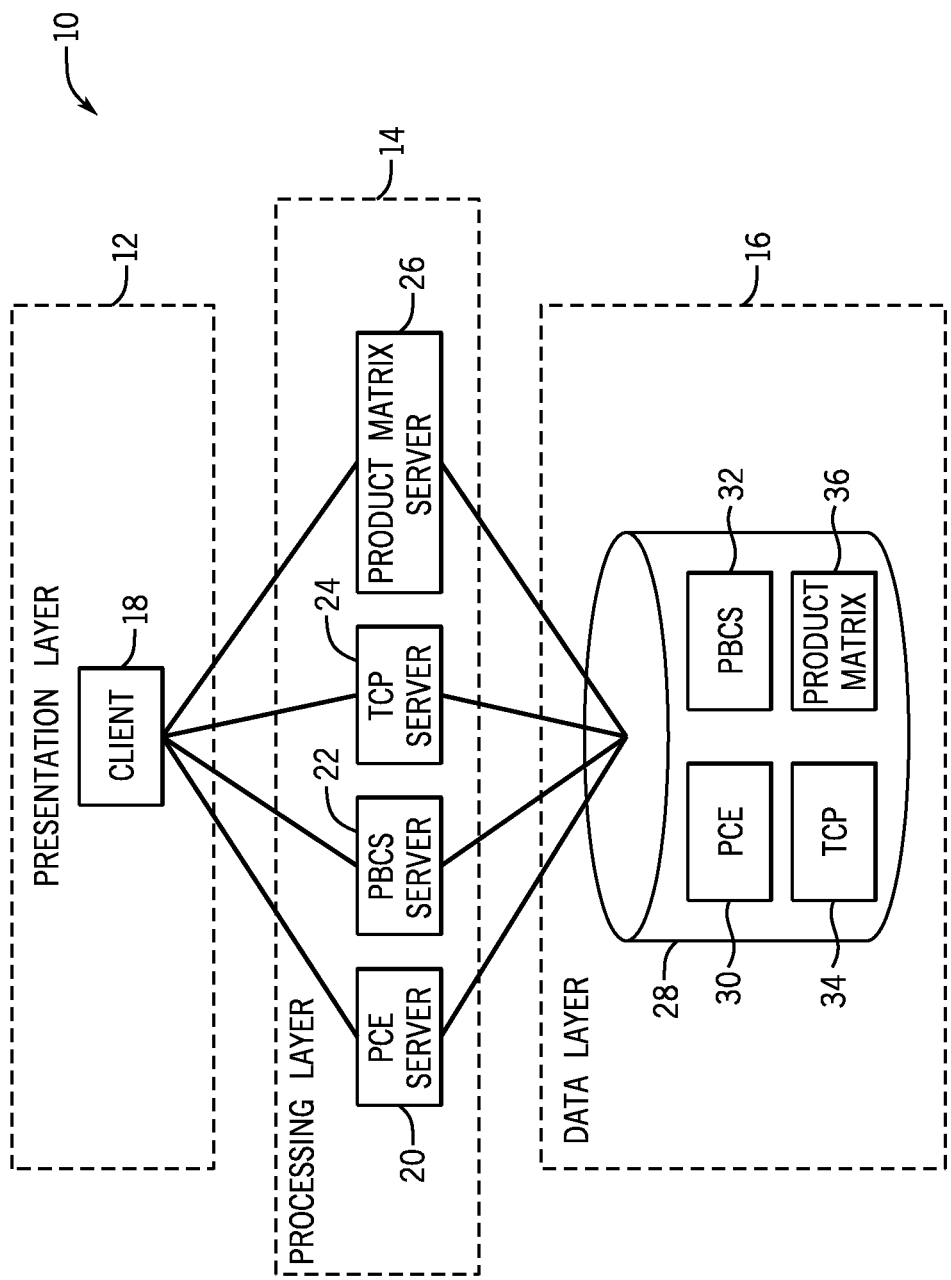
FIG. 1 is a block diagram of a system for a product compliance fulfillment portal, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that compliance requirements may refer to one or more regulations and/or standards provided by a regulatory agency in a territory. A territory may include a country, state, municipality, sales region, and so forth.

As previously discussed, entities (e.g., companies, organizations, and the like) may maintain a record of the regulations and standards that certain products satisfy to be shipped, sold, distributed, and the like, in various territories. More specifically, one or more businesses (e.g., departments) within an entity may sell similar products and the businesses may each maintain separate records of the compliance requirements to ship and/or sell those products in certain territories. When a new or existing business within the entity tries to fulfill a customer order for that product type, the new or existing business may need to acquire the records from each of the other businesses who deal with the product type that may show the requirements for the product in the desired territory. However, the records that are maintained by each business may be contradictory if not kept up to date. For example, a record from one business may include a regulation for a product that is no longer applicable because it is no longer enforced. Further, the records may not indicate whether the product is compliant or what can be done to make the product compliant for the desired territory, function, application, governmental regulation (e.g., municipal, city, state, federal), or a combination thereof. As such, the inquiring business may have to determine on its own whether the desired products are compliant with the desired requirements or what needs to be done and how much it would cost to make the product compliant before agreeing to fulfill the order.

Thus, present embodiments relate to an online product compliance fulfillment portal (hereinafter referred to as "the portal") that may tie regulations and standards for a territory, a function, a desired application, a governmental regulation, or a combination thereof, to the products or product lines that are offered. The portal may show how the regulations and standards are met by the products or product lines, and derive a compliance plan to fulfill a customer order, among other things. It should be noted that the term "portal" may refer to a website that provides access to one or more different tools from a central online location. However, "portal" may also refer to standalone software distributed by other techniques, such as a flash drive, compact disk (CD), digital video disk (DVD), and the like. The portal enables quick research of the requirements for a product in a territory, function, application, governmental regulation, or some combination thereof, expiration dates of the requirements, and whether a product has been evaluated for sale into a territory. In addition, the portal is integrated so it enables central sharing of research across multiple businesses with like product types. This may allow for maintaining accurate information relating to products and their regulations in various territories between businesses at all times for the users of the tool. Also, because the tool is integrated, any time that a regulation changes or expires, all businesses involved may be more quickly notified. This may help ensure that products are delivered meeting all the applicable requirements.

To achieve the foregoing, the portal may provide access to a processor-executable product compliance evaluation (PCE) tool, a processor-executable product baseline compliance specification (PBCS) tool, a processor-executable transactional compliance plan (TCP) tool, and a processor-executable product matrix tool. The tools may access and share information stored in a common database in order to provide various functionality. For example, the PCE tool may enable accepting the requirements per territory and organizing the requirements by products, product type, and/or business. A business may search via the PCE tool to determine what the requirements are for a product in a specified territory, function, application, governmental regulation, or combination thereof. The PBCS tool may leverage the information acquired by the PCE tool and enable a user to specify how a product meets a requirement for a territory, function, application, governmental regulation, or some combination thereof, and assign a compliance status. Thus, in some embodiments, a product compliance server may be adapted by uploading data relating to product compliance and product baseline compliance specifications into a database repository. The user may search via the PBCS tool to determine whether a product is compliant in a territory function, application, governmental regulation, or some combination thereof, and see how the product is compliant or why the product is not compliant.

Further, the TCP tool may enable a sales person to begin an inquiry to order (ITO) by entering a customer's order, which may include one or more products for a desired territory. The TCP tool may utilize the information acquired by the PCE and PBCS tools to derive a plan of compliance for the specific products in the territory for execution teams to start the project. This may include performing a compliance check and a gap analysis to determine how to convert any non-compliant products in the customer order into products compliant in the desired territory, compliance costs, how long the compliance may take, and so forth. Additionally, the product matrix tool may provide a report of products' compliance statuses in desired territories by business. Advantageously, the portal's tools may enable a sales person to more efficiently communicate with customers with up to date, near real-time data to provide the customers with a faster indication of whether an order is compliant and can be fulfilled or, if an order is not compliant, how to achieve compliance, compliance costs, and time to achieve compliance.

A block diagram of a system 10 of the product compliance fulfillment portal is illustrated in FIG. 1. The portal may be implemented as computer instructions stored on one or more tangible, non-transitory computer-readable mediums stored in memory and executable via one or more physical processors. In an embodiment, the system 10 architecture of the portal may include at least three layers: a presentation layer 12, a processing layer 14, and a data layer 16. However, the architecture may not be limited to three layers. Indeed, the techniques described may be implemented utilizing any number of layers suitable to achieve the intended purposes. For example, a business logic layer may be separated from the processing layer if desired, and so forth. The presentation layer 12 may include a plurality of web-based client tools 18 interfacing with the processing layer 14 via web browsers. The clients 18 may enable a user to interact with the portal through a plurality of graphical user interfaces (GUIs) displayed in web pages in the web browsers. The GUIs may be written in any suitable client programming language including JavaScript, ASP.NET, JSP, Ruby on Rails, Django, PHP, and so forth. The web pages may be provided by one or more application servers that receive requests from the clients 18 over a computer network (e.g., the Internet. local area network, wide area network). The application servers are configured to communicate within a client-server network. In one embodiment, the system 10 may be executable in a single computing device without using external communicative access, thus providing for portable access in remote locations. Also, in some embodiments, the clients 18 may be thin clients in that most of the processing and memory usage takes place on the application servers. However, in other embodiments, the clients 18 may handle portions of the processing and utilize local memory.

The one or more application servers may reside in the processing layer 14 and may include a PCE server 20, a PBCS server 22, a TCP server 24, and a product matrix server 26. Each of the servers 20, 22, 24, 26 may include memory and one or more physical processors configured to execute executable instructions. The application servers (20, 22, 24, and 26) may be configured to receive requests from the clients 18, perform a task based on the request, and return a response. The clients and servers may communicate over one or more standard protocols for exchanging messages, such as transmission control protocol (TCP), hypertext transfer protocol (HTTP), and the like. In certain embodiments, a home screen of the portal may be delivered to the user's browser that includes links to the different tools. Based on the user's selection, the portal will route the request to the respective application server (20, 22, 24, and 26).

It should be noted that, in some embodiments, the tools may not be separate servers but, instead, may be separate systems, modules, objects, functions, and so forth of a single application server, or multiple servers (e.g., distributed servers, including cloud-based servers). The application servers (20, 22, 24, and 26) may include a combination of software and hardware. For example, the application servers may include computer instructions stored on a non-transitory, computer-readable medium that may cause one or more processors to perform various tasks described herein. It should be further noted that "PCE tool" may refer to the functionality provided by the PCE server 20, "PBCS tool" may refer to the functionality provided by the PBCS server 22, "TCP tool" may refer to the functionality provided by the TCP server 24, and "product matrix tool" may refer to the functionality provided by the product matrix server 26.

The application servers (20, 22, 24, and 26) may receive multiple requests from multiple clients 18 simultaneously. As such, the application servers (20, 22, 24, and 26) may employ load balancing techniques to distribute the requests. For example, each application server may include one or more servers (e.g., the PCE server 20 may include four identical PCE servers) where one server is designated as the main server. When the main server receives a request, it can utilize an algorithm, such as round robin, to determine which server's turn it is to process the request and route the request accordingly. Further, the application servers (20, 22, 24, and 26) may utilize scheduling techniques to prioritize requests. In this way, the application servers (20, 22, 24, and 26) response time may be enhanced by managing the incoming requests.

In some embodiments, the PCE server 20, the PBCS server 22, the TCP server 24, and the product matrix server 26 may be deployed on the same computer and a part of one portal system (e.g., a product compliance server). In other embodiments, the application servers (20, 22, 24, and 26) may be deployed on different computers and the portal may function as a distributed system. Each server may include the computing logic for the particular tool that it represents. Thus, the servers may accept inputs from the clients' requests and generate one or more commands for the data layer 16. The commands to the data layer 16 may be executed as in-line database queries in the computing logic of the application servers, as compiled stored procedures, or some combination thereof.

The data layer 16 may include one or more articles of manufacture (e.g., memory) suitable for storing data. Indeed, the articles of manufacture may include tangible, non-transitory computer-readable mediums configured to store data. In the depicted embodiment, the data layer 16 includes a single database 28 that houses the PCE data 30, the PBCS data 32, the TCP data 34, and the product matrix data 36 provided by and related to the PCE server 20, the PBCS server 22, the TCP server 24, and the product matrix server 26. The database 28 may be relational in nature and include tables that are described and organized according to the relational model. That is, the database schema utilized may involve a column or group of columns designated as the primary key that uniquely identify each row. Then, a relationship may be established between each row in the table and a row in another table by creating a foreign key that points to the primary key of another table. The database may be implemented utilizing any suitable database technology, which may be proprietary or open-source. However, the database 28 may be any type of database suitable for storing and retrieving data including a network database (e.g., CODASYL, TurboIMAGE), a file, a noSQL database (e.g., BaseX, Apache CouchDB, SimpleDB), or any other type of data storage. Further, by housing the data for the separate servers (20, 22, 24, and 26) in one database, the products, compliance requirements, territories, businesses, and other data may be more tightly coupled and searched without having to communicate with separate data stores. However, in some embodiments, the PCE server 20, the PBCS server 22, the TCP server 24, and the product matrix server 26 may store and retrieve data in separate databases, for example, for enhanced redundancy and/or load balancing.

Figure 2:
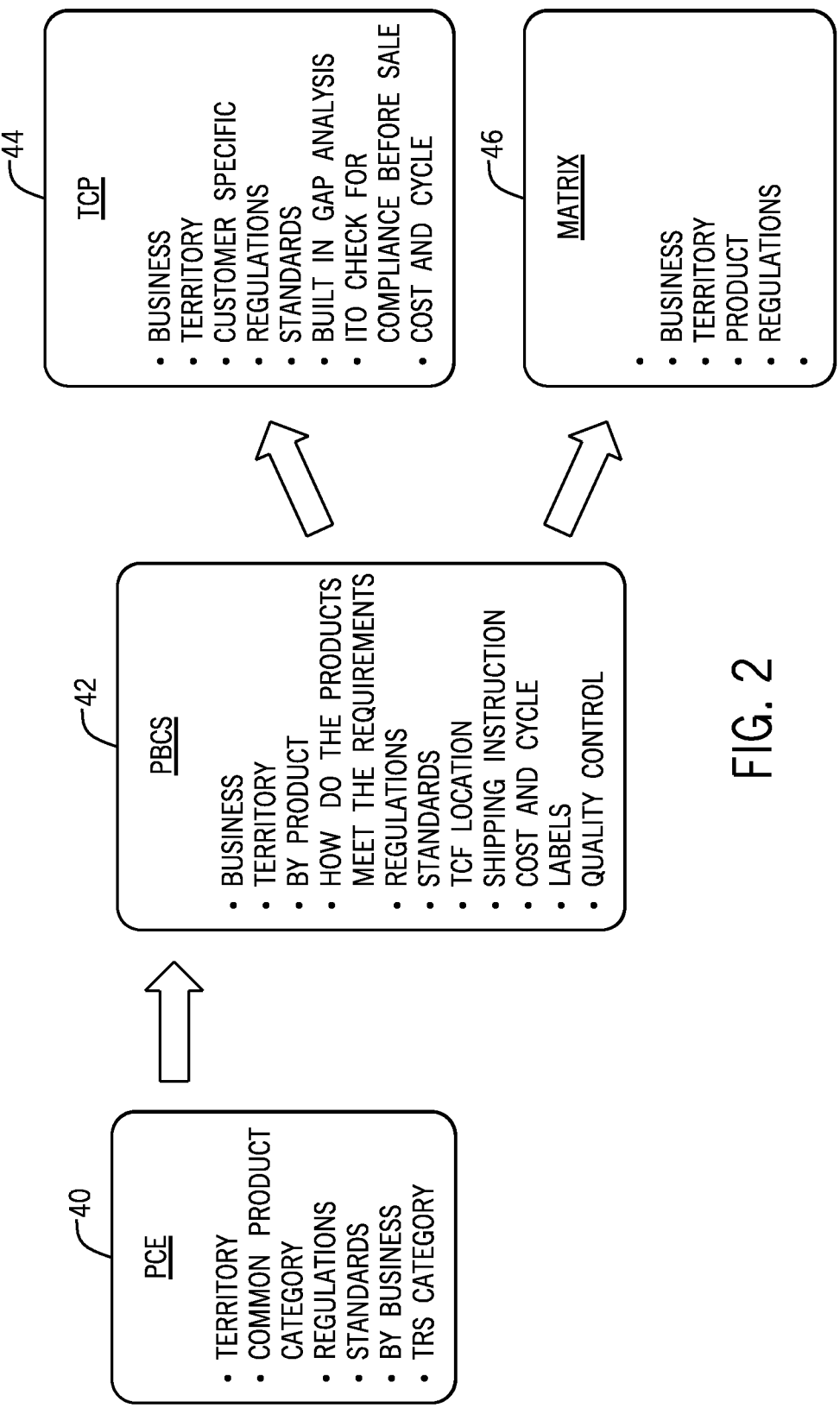
FIG. 2 is a block diagram of tools interaction within the product compliance fulfillment portal system, in accordance with an embodiment.

FIG. 2 is a block diagram of embodiments of the PCE tool 40, PBCS tool 42, TCP tool 44, and product matrix tool 46, including interactions or information flow between the tools. As previously mentioned, the PCE tool 40 may be utilized to enter and display the regulations that a product is required to meet for a particular territory, function, application, governmental regulation, or combination thereof. For example, the data that the PCE tool 40 may store for each product is the territory, function, application, governmental regulation, or combination thereof that the regulations are for, the common product category, the regulations, the standards, the internal business, and the TRS category. The regulations and standards may include technical regulations (e.g., national electrical manufacturers association (NEMA) standards, institute of electrical and electronics engineers (IEEE) standards), international traffic in arms regulations (ITAR) standards, legal regulations, contractual regulations, and so forth. The regulations and standards may apply to industrial monitoring and protection systems, controls (e.g., controller systems), and the like. A user having the proper access rights may enter new regulations into the PCE tool 40 as desired.

The PCE tool 40 may enable the businesses included in an entity to search for products and see the regulations and standards required to be compliant within a specific territory. The business may tailor the regulations and standards for the product if the regulations and standards are different for the type of product the business intends to ship, sell, or distribute in the country. Thus, the information may be further organized by business. That is, the requirements may be different in a territory for the same product based on the business or any other of a variety of factors (e.g., type of product, production function, and so on). The PCE tool 40 may function as the main data entry tool in the portal for providing the compliance requirements for a territory tied to specific products. As will be described below, this data may be utilized by the PBCS tool 42, the TCP tool 44, and the product matrix tool 46 to perform their respective functionalities. The PCE tool 40 may also provide reporting functionality to generate a report of the PCE information, such as all the regulations for a product in a specific territory.

The PBCS tool 42 may enable a user to determine what the regulations are for a product in one or more countries through the use of its search tool. In addition, the PBCS tool 42 may enable a user to add PBCS data 32 or edit the search results of PBCS data 32 by specifying how a product satisfies a particular compliance requirement for a territory. The information that was stored by the PCE tool 40 may be communicated to or queried by the PBCS tool 42 when performing its queries. For example, the PBCS tool 42 may utilize the regulations and standards associated with a particular product, business, and territory from the PCE tool 40. To that end, the search results displayed by the PBCS tool 42 may include a variety of information, including the business associated with the product, the territory, the product, how the products meet the requirement, the regulations, the standards, shipping instructions, cost and cycle, labels, and quality control, among others. Thus, the PBCS tool 42 may display how the requirements for a specific territory tie to a specific product and how the product satisfies those requirements or how much it would cost and the cycle time to satisfy the requirements.

The TCP tool 44 may enable determining how to meet a customer's order of one or more products for one or more territories. The TCP tool 44 may achieve this by performing an inquiry to order (ITO) compliance check on the customer order before sale and determining whether the selected products are compliant in the target territories. There are several statuses associated with each product that may be displayed to the user after the check is executed. The statuses may include "complies," "can comply—check cost and cycle," "needs evaluation," or "cannot comply," among others. If the product is deemed "can comply," a built-in gap analysis may be performed that may determine possible steps or actions to make the product compliant for the territory's regulations and/or standards and the analysis projects a cost and a cycle time to make the product compliant. Based on this information, a sales team may inform the customer that the order can be fulfilled if certain steps or actions are taken and the sales team can provide the projected cost and the cycle time to the customer. To that end, the TCP tool 44 may display various information, including the business associated with the product, the country, the customer, the regulations, the standards, the compliance status, the cost and cycle time to comply, and so forth. The benefits of this technique may include providing a quick quote to the customer regarding how much it will cost and how long it will take to make an order compliant. Further, the techniques described herein may prevent the business from accepting an order in which it cannot fulfill, among other things.

The product matrix tool 46 may provide a report of products compliance statuses in various territories by business. A sales team may find this tool 46 particularly useful because it can consult the matrix prior to making any product offerings. The product compliance analysis and research may have been done already and the information in the matrix should be up to date, which allows the sales team to determine whether certain customer orders can be fulfilled at a glance. Thus, the tool 46 may inhibit the sales team or any other team from pulling extraneous information from separate tools before intelligently communicating with a customer regarding an order.

Figure 3:
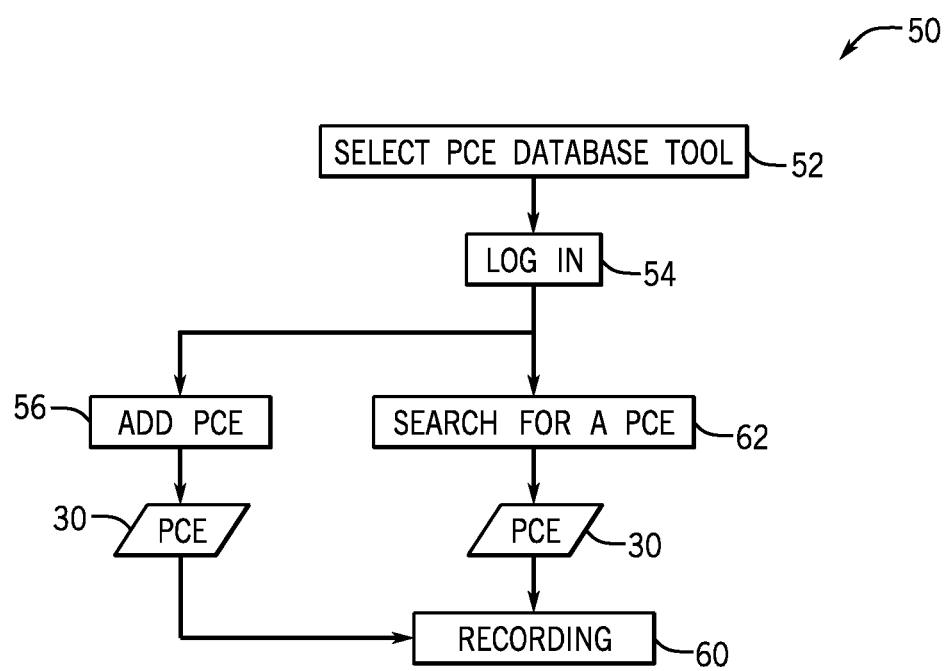
FIG. 3 is a flowchart of a process for a product compliance evaluation (PCE), in accordance with an embodiment.

FIG. 3 is a flow chart of an embodiment of a process 50 for the PCE tool 40. The process 50 may be implemented as executable instructions stored in memory and executable via one or more processors. The process 50 may begin with the user selecting the PCE tool 40 (block 52) from the home page of the portal, for example, via a web client. The portal may direct the user request to the PCE server 20, which may return a web page displaying a login screen to the PCE tool 40. The user may enter user credentials or other identifier number to login to the tool (block 54). It should be noted that the portal may utilize single sign-on so that once a user logs into one of the tools, the user may access the other tools without reentering their credentials or other identifier. In some embodiments, a user list and their role(s) may be maintained in a database. If a user is assigned an administrator role or business user role, the user may be enabled to add and/or edit PCE data 30. However, if the user is only assigned a viewer role, the user may only be enabled to search for PCE data 30. In other embodiments, the login screen may not be displayed and, instead, when the user clicks the PCE tool link, the portal may perform other forms of authentication on the user account (e.g., card-based authentication, key fob authentication, challenge-response authentication, and so on). In this embodiment, certain features may be enabled and disabled based on the roles associated with the user's account, too.

If the user is granted the right to add PCE data 30, the user may add a PCE if desired (block 56). The user may be presented with a PCE creation tool that enables the user to enter the territory (e.g., country, state, municipality, sales region), the common product category, the regulations, the standards, the business, and the TRS category. Further, the user may enter an expiration date for the regulations and/or standards, if known. Whenever a new regulation is released, the user with the proper rights may add the PCE data 30 utilizing the PCE tool 40. Also, whenever a regulation changes or is removed, the user with edit rights may make the necessary modifications to keep the PCE data 30 in the PCE tool 40 up-to-date. As may be appreciated, any number of regulations that apply to a product may be loaded into the PCE tool 40 and organized by territory, business, common product category, and so forth.

Once the PCE data 30 is entered (block 56), the data may be presented or displayed on the browser in a report, recorded, and/or distributed to interested parties (block 60). The report may display the product, the regulations, the standards, the effective date, the expiration date, the territory, and so forth. In some embodiments, the PCE tool 40 may automatically detect a change (e.g., addition, modification, deletion) to PCE data 30 and trigger an alert to be distributed to interested parties. In some embodiments, a search daemon continuously searches the PCE data for changes. For example, if a new regulation for a product is added, an alert (e.g., email) may be sent to all businesses that work with the particular product. Likewise, any time a regulation for a product is changed, an alert may be sent to all businesses working with the product. Also, if a regulation for a product is about to expire, an alert may be sent out a configurable amount of time before the expiration date to the businesses interested in the product.

A user may also search for a PCE (block 62) by utilizing the search tool provided by the PCE tool 40. As shown in the illustrated screen views below, the PCE tool 40 may enable a user to enter the business, territory, and/or the product category, and the PCE data 30 may be retrieved by the PCE server 20 from the database 28 and returned to the client that displays the information to the user (block 60). The search results may display information including the products, the product category, the regulations and standards that must be met for the respective products to be compliant in the selected territory, the territory, the business working with the product, the effective date and expiration date of the regulations and/or standards, and so forth.

Figure 4:
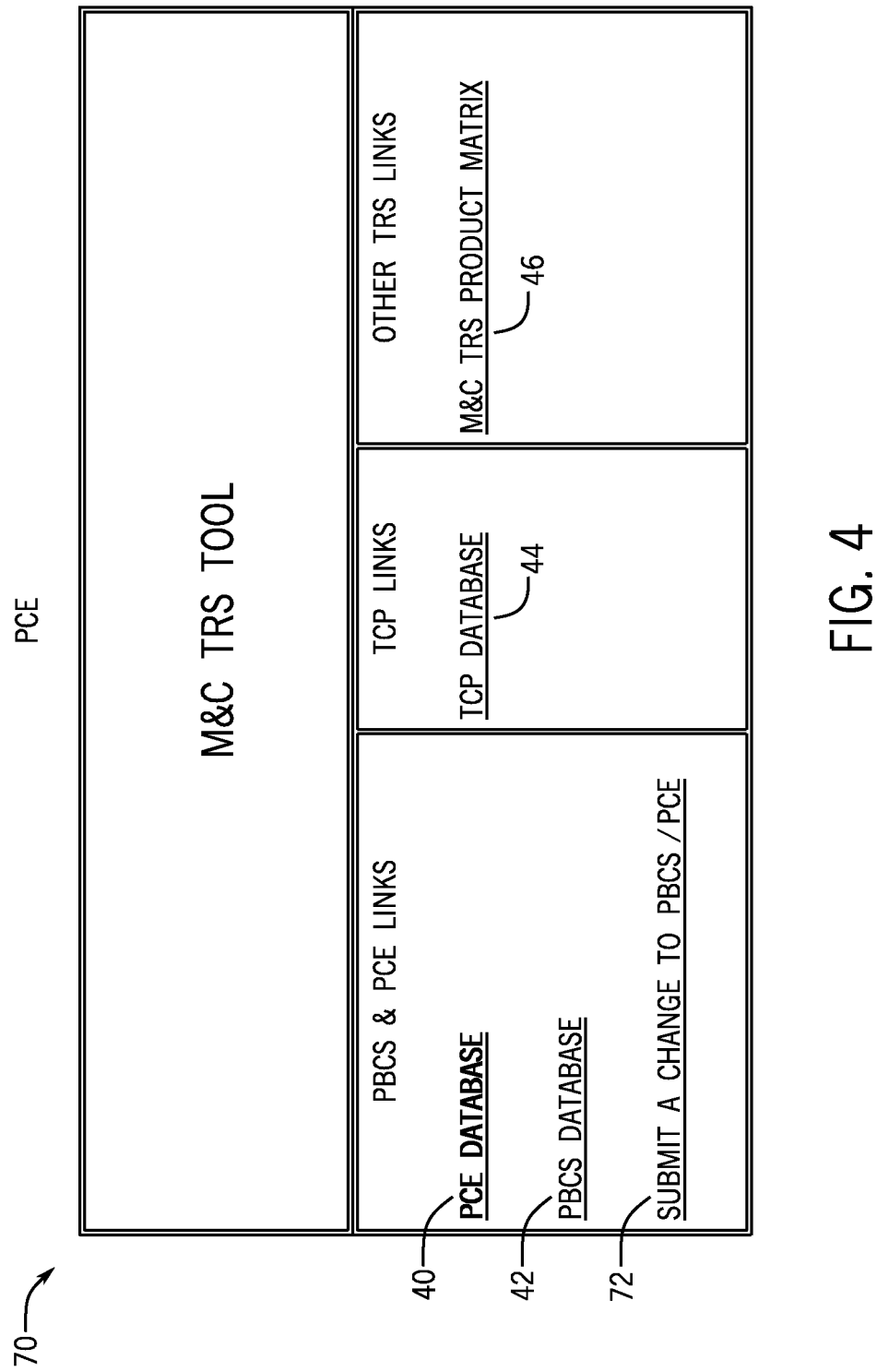
FIG. 4 illustrates a home screen for the product compliance fulfillment portal of FIG. 1, where a PCE tool is selected, in accordance with an embodiment.

FIGS. 4-6 illustrate embodiments of various views described in FIG. 3 for utilizing the search tool provided by the PCE tool 40 to search for a PCE. In particular, FIG. 4 illustrates an embodiment of a home screen 70 for the portal where the PCE tool 40 is selected or otherwise activated (block 52 from FIG. 3). As depicted, the home screen 70 may be displayable via a client browser and includes links (e.g., hyperlinks) to the PCE tool 40, the PBCS tool 42, the TCP tool 44, and the product matrix tool 46. Further, a link to submit a change to a PBCS or PCE 72 may be displayed. After the user logs in (not shown), the user may be presented with an embodiment of a search tool screen 76 provided by the PCE tool 40, as illustrated in FIG. 5.

As shown in FIG. 5, the user may select from various search criteria from the search tool screen 76, including a business 78, a country 80 (or any other territory), and/or a product category 82. Each search criteria may have a default value, such as "all." After selecting the desired search criteria, the user may activate the "Get Info" button 84 to cause the PCE server 20 to utilize the entered parameters as part of commands to search the database 28 for the PCE data 30 (block 62 from FIG. 3). The database 28 may process the commands by searching any PCE related tables and returning a result dataset to the PCE server 20, which may represent the dataset in a graphical element such as a chart, graph, gridview, and so forth, on a webpage and return the webpage for display to the requesting client 18.

For example, FIG. 6 illustrates an embodiment of a search results screen 90 provided by the PCE tool 40 where the PCE data 30 is graphically represented in a chart 92 (block 60 from FIG. 3). As shown, the chart 92 may include columns for the PCE data 30, such as business 94, product category 96, product 98, member country 100, country 102, regulation category 104, regulation 106, comments 108, regulation status 110, research source 112, applicability 114, approver 116, standard 118, standard status 120, and so forth. As may be appreciated, the search results screen 90 may enable a user to view the chart 92 and determine the regulations and standards for a product and business in a particular country or territory.

Figure 7:
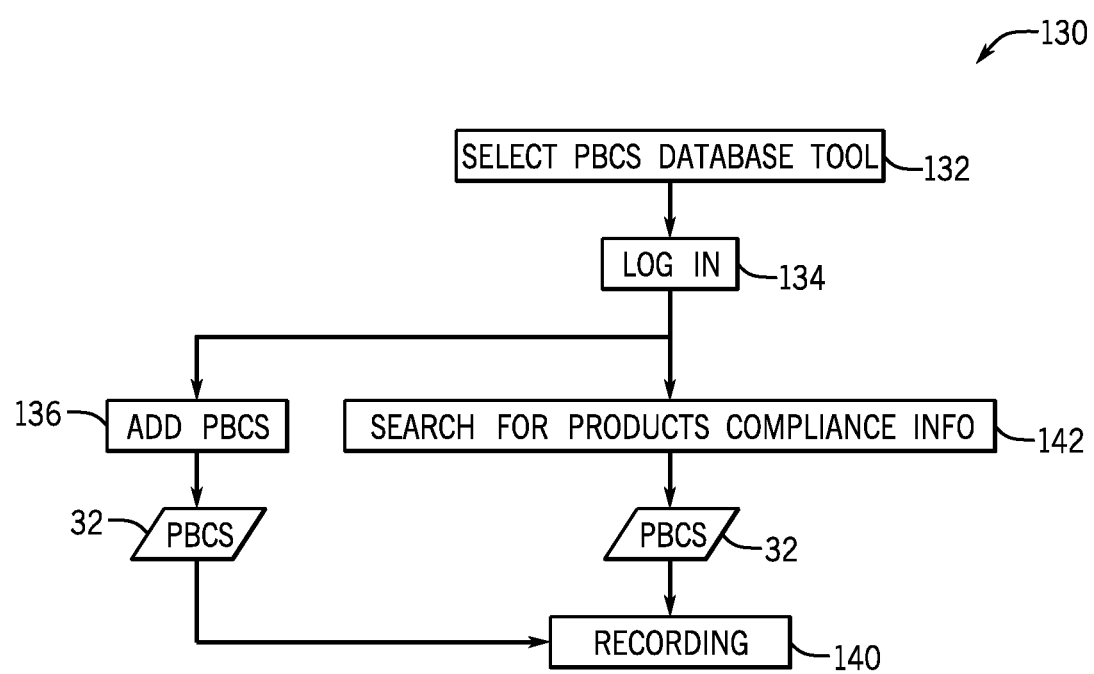
FIG. 7 is a flowchart of a process for a product baseline compliance specification (PBCS), in accordance with an embodiment.

FIG. 7 is a flowchart of an embodiment of a process 130 executable via the PBCS tool 42, in accordance with an embodiment. The process 130 may be implemented as executable instructions stored in memory and executed by one or more processors. The process 130 may begin by the user selecting the PBCS tool 42 from the portal's home screen 70 (block 132). This may prompt the user to provide credentials at a login screen (block 134). After login, as with the PCE tool 40, the user may be allowed to add/edit PBCS data 32 based on the role or authority granted to the user. If the user is an administrator, for example, the user may proceed to add PBCS data 32 (block 136). This may include presenting the user with a PBCS creation tool screen where the user enters various PBCS information. However, in some embodiments, the PBCS information may automatically populate based on the business, product, and country selected, since the PCE data 30 is utilized by the PBCS tool 42. For example, once the user selects the business, country, and product for a new PBCS, any regulations and standards that are found for the combination of the business, country, and product may populate on the creation tool screen. Further, a user may enter how the products meet the requirements, among other things. This information may be useful for reporting purposes to submit to regulatory agencies as proof that the product meets the requirements and describes how the product meets the requirements. Once the PBCS data 32 is created, it may be utilized in a report that is displayed to the user on a webpage provided by the PBCS server 22 (block 140). Moreover, a user with proper authority may be able to edit PBCS data 32. Similar to the PCE tool 40, the PBCS tool 42 may be configured to automatically detect changes and send out alerts (e.g., emails) to the parties interested in a particular product when new PBCS data 32 is added, edited, deleted, or the like, for the product. In some embodiments, a search daemon continuously searches the PCE data for changes In addition, after logging in, a user may search for a product's compliance information (block 142) by utilizing a search tool provided by the PBCS tool 42. In some embodiments, a user may select a business, product, and/or country and the PBCS tool 42 may send the input parameters to the PBCS server 22, which will perform a query on the database 28 and return a webpage displaying the search results. The search results may include the compliance requirements, cost and cycle time, revision history, and so forth for the business, product, and country combination.

Figure 8:
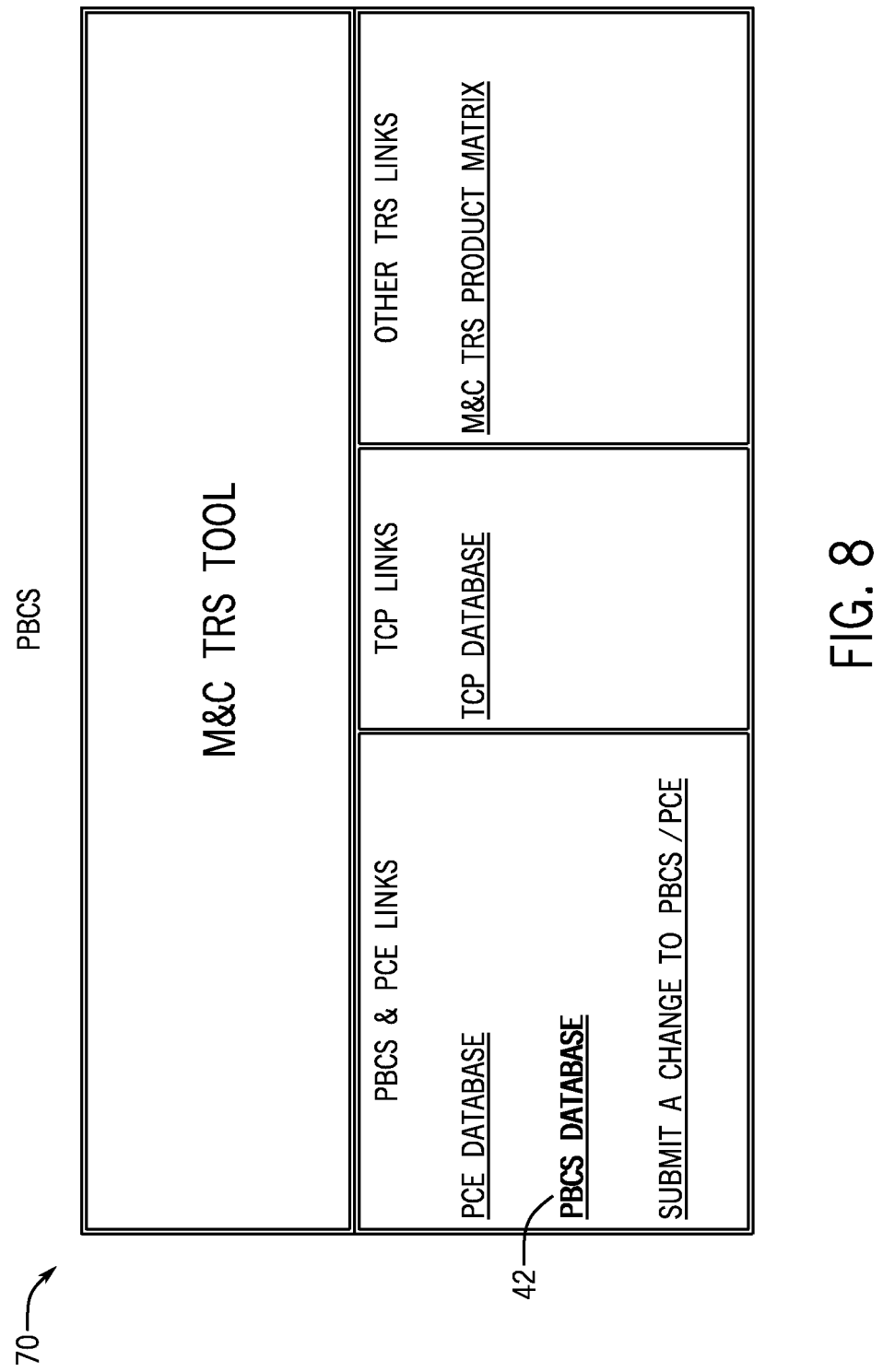
FIG. 8 illustrates a home screen for the product compliance fulfillment portal of FIG. 1 where the PBCS tool is selected, in accordance with an embodiment.
Figure 9:
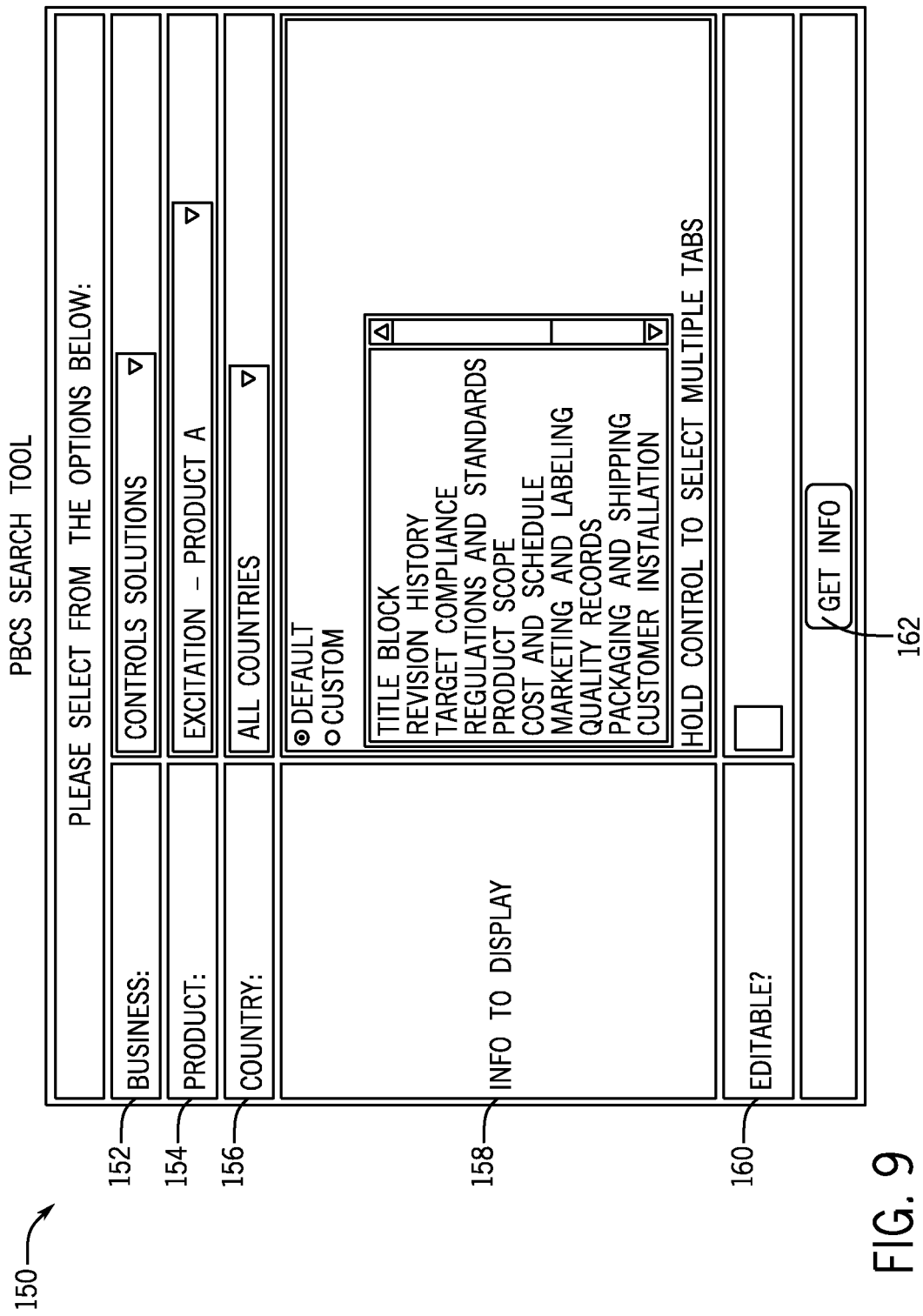
FIG. 9 illustrates a search tool screen provided by the PBCS tool, in accordance with an embodiment.

To illustrate, FIGS. 8-13 show embodiments of various webpage screens displayed to the user during the searching use case scenario. Specifically, FIG. 8 illustrates an embodiment of the home screen 70 for the product compliance fulfillment portal where the PBCS tool 42 is selected (block 132 from FIG. 7). After the user selects the PBCS tool 42 from the home screen 70, the user may be prompted by a log in screen to enter their credentials (block 134 from FIG. 7). In some embodiments, however, the user may not be prompted to log in if single sign-on is utilized and the user may access the search tool provided by the PBCS tool 42 directly after clicking the link. An embodiment of a search tool screen 150 provided by the PBCS tool 42 is illustrated in FIG. 9.

As depicted, the search criteria may include a business 152, a product 154, and a country 156. It should be noted that in addition to country 156, other territories may be searchable, such as state, sales region, municipality, and so forth. Additionally, the user may be presented with the options to select which information to display 158 (e.g., columns, headings, tabs) on the search results screen and whether to make the information displayed editable by activating control 160. In an embodiment, the editable option 160 may only be enabled if the user has the proper authority to edit PBCS data 32. For example, if the user is granted certain roles, such as an administrator role, business user role, or the like, that include the ability to edit PBCS data 32. Each search criterion (152, 154, and 156) may have a default value, such as "all," selected initially. Similarly, the information to display 158 may include radio buttons or other controls that the user can set to display the default information (e.g., all columns, headings, or tabs) or to display custom information. If the user selects to display custom information, the user may select the information columns, headings, tabs, or the like to display on the search results screen. In the depicted embodiment, the user has selected "controls solutions" as the business 152, "excitation—product A" as the product 154, and "all countries" as the country 156. The user also selected "default" for the information to display 158 and did not select the information to be editable via control 160.

After the user activates the "Get Info" button 162, or any suitable search button, the PBCS server 22 may retrieve the PBCS data 32 (e.g., data set) based on the selected business 152, product 154, country 156, and desired information to display 158 from the database 28. Once the PBCS server 22 obtains the PBCS data 32, the PBCS server 22 may present the PBCS data 32 on a webpage that is displayed on the client's browser. For example, FIG. 10 illustrates a search results screen 170 provided by the PBCS tool 42, in accordance with an embodiment. The search results screen 170 may display the product 154 and the country 156 selected on the search tool screen 150. Thus, as shown, at the top of the search results screen 170 "excitation—product A: all countries" is displayed. Further, the search results screen 170 may include a plurality of tabs that reflect the information to display 158 selected on the search tool screen 150.

The tabs may include the "Title Block" tab 172, "Revision History" tab 174, "Target Compliance" tab 176, "Regulations and Standards" tab 178, "Product Scope" tab 180, "Cost and Schedule" tab 182, "Marketing and Labeling" tab 184, "Quality Records" tab 186, "Packaging and Shipping" tab 188, "Customer Installation" tab 190, "Language" tab 192, "Quality Controls" tab 194, "Technical Files" tab 196, and so forth. In the depicted embodiment, the "Title Block" tab 172 is selected. This tab 172 may display the names of people associated with certain titles working on a project. The titles may include quality representative 198, process owner 200, and so forth. If a user has questions regarding the search results provided, such as whether a product meets certain regulations or wants more information how the product meets regulations, the "Title Block" information may provide the user with the name of the person to contact.

Turning now to FIG. 11, the figure depicts an embodiment of the search results screen 170 provided by the PBCS tool 42 for the same search criteria (152, 154, and 156) selected on the search tool screen 150 in FIG. 9. In the depicted embodiment, the "Revision History" tab 174 is selected and the respective information is displayed. As shown, the revision history information may include a revision number 202, a date 204, an author 206, and a description of the change made 208. Tracking the revision history may enable subsequent users to look at the record for PBCS data 32 and determine whether the compliance information has been changed, why it was changed, and so forth, based upon the description of the change made 208 entered by the author 206.

Additionally, FIG. 12 illustrates an embodiment of the search results screen 170 provided by the PBCS tool 42 where the "Target Compliance" information is displayed for the same search criteria (152, 154, and 156) selected on the search tool screen 150 in FIG. 9. The information displayed by selecting the "Target Compliance" tab 176 may include a country 210, a member country 212, and the product's status for non-hazardous 214 and hazardous 216 compliance. This information may provide the user with information on which countries that the product is compliant in and countries where the product lacks compliance. The statuses 214, 216 displayed also notify the user whether the product needs evaluation in the target countries.

FIG. 13 illustrates an embodiment of the search results screen 170 provided by the PBCS tool 42 where the "Regulations and Standards" information is displayed for the same search criteria (152, 154, and 156) selected on the search tool screen 150 in FIG. 9. The information displayed by selecting the "Regulations and Standards" tab 178 may include a country 218, a state 220, a sales region (not shown), a municipality (not shown), a regulatory category 222, a technical regulation 224, a severity 226, a standard 228, a compliance status 230, a conformity assessment 232, and so forth. As previously mentioned, the regulation and standard compliance requirements for the particular product and territory combination may be retrieved from the data entered in the PCE tool 40.

If the user enabled editing via control 160 on the search tool screen 150 in FIG. 9, the user may enter comments in a conformity assessment 232 textbox. For example, if the compliance status 230 for the selected product's regulation and/or standard is "complies," the user may enter comments how the product meets the regulation and standard in the textbox 232. Likewise, if the compliance status 230 for the selected product's regulation and/or standard is "can comply," the user may enter comments about what may be done to make the product comply in the textbox 232. Also, if the compliance status 230 is "does not comply," the user may enter comments about why the product does not comply in the textbox 232. Therefore, the PBCS tool 42 may provide an improved interface for a user to view the compliance requirements for a specific product in any desired territory (e.g., country, state, municipality, sales region) and determine whether it is compliant and why or what can be done to make the product compliant by reading the conformity assessment 232.

Figure 14:
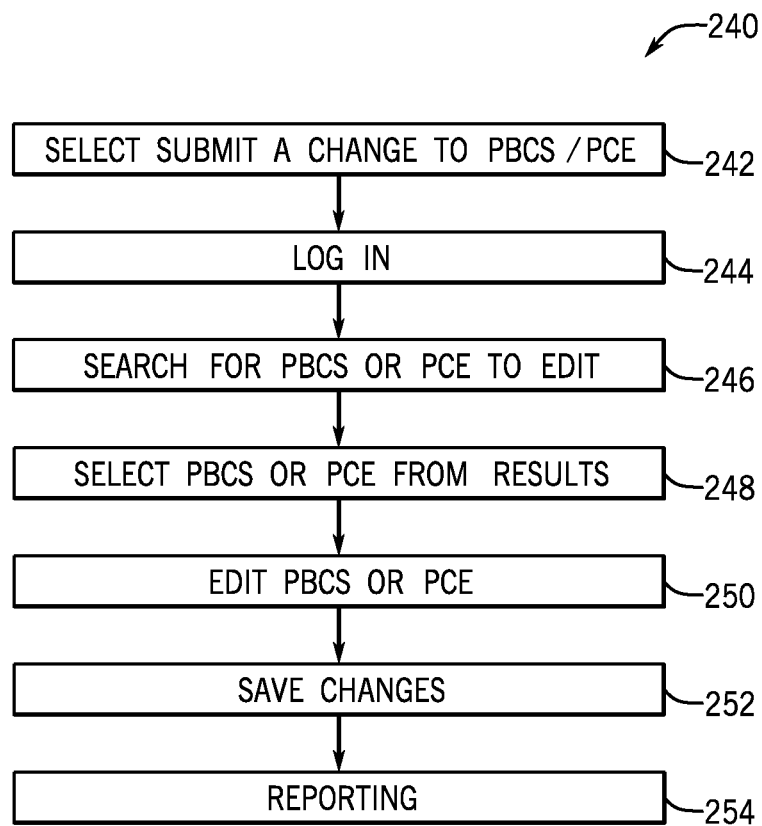
FIG. 14 is a flowchart of a process for editing a PBCS data or a PCE data, in accordance with an embodiment.

As previously discussed, the PCE data 30 and the PBCS data 32 may be modified by a user. As such, FIG. 14 is flow chart of a process 240 for editing PCE data 30 or PBCS data 32. The process 240 may be implemented as executable instructions stored in memory and executable by one or more processors. The process 240 may begin by the user selecting the link to submit a change to a PBCS/PCE from the portal's home screen 70 (block 242). Then, the user may be prompted with a login screen in block 244. If the user enters recognized credentials, product number, or any other suitable identifying number, the user may search for the PCE data 30 or PBCS data 32 to edit (block 246). Searching may include the user selecting either PCE data 30 or PBCS data 32 to edit and selecting the product, business, and/or country to search. Once the search results are displayed to the user, the user may select the PCE data 30 or PBCS data 32 from the results (block 248) and perform any edits to the selected PCE data 30 or PBCS data 32 (block 250).

The user may desire to edit the regulations associated with a product for a particular territory if the regulation has changed, its expiration date has changed, and the like. After the user has made any desired changes, the user may save the changes to the PCE data 30 or the PBCS data 32 in the database 28 (block 252). The updated PCE data 30 or PBCS data 32 may then be displayed on a screen to the user via a report, display, and so on (block 254). Further, the portal may send out an alert (e.g., email) to any party (e.g., business) that is working with the product, regulation, or country affected or has an interest in the product, regulation, or country affected. Thus, interested parties may be kept up to date with the compliance requirements for the products in certain territories that they work with so that they may more efficiently communicate with customers regarding orders.

Turning now to the TCP tool 44, the tool 44 may leverage PCE data 30 and PBCS data 32 to derive a plan of compliance. The compliance plan may specify fulfillment instructions to fulfill the customer order. For example, the compliance plan may be utilized by an execution team to start a project in order to make one or more products compliant in a specific territory and/or to fulfill a customer order. In some embodiments, the fulfillment instructions may include computer-executable instructions suitable for execution via a second processor and configured to calculate a cost to comply and cycle time to comply for each regulation applicable to the product in the desired territory. Generally, a customer may request to order certain products in a certain territory, and the TCP tool 44 may provide insight to how the entity may satisfy the order in that territory. That is, the tool may provide assurance that the engineering team and the sales team know what is required to make the products specified in the customer's order compliant with the regulations and standards for the territory if they are not already.

Figure 15:
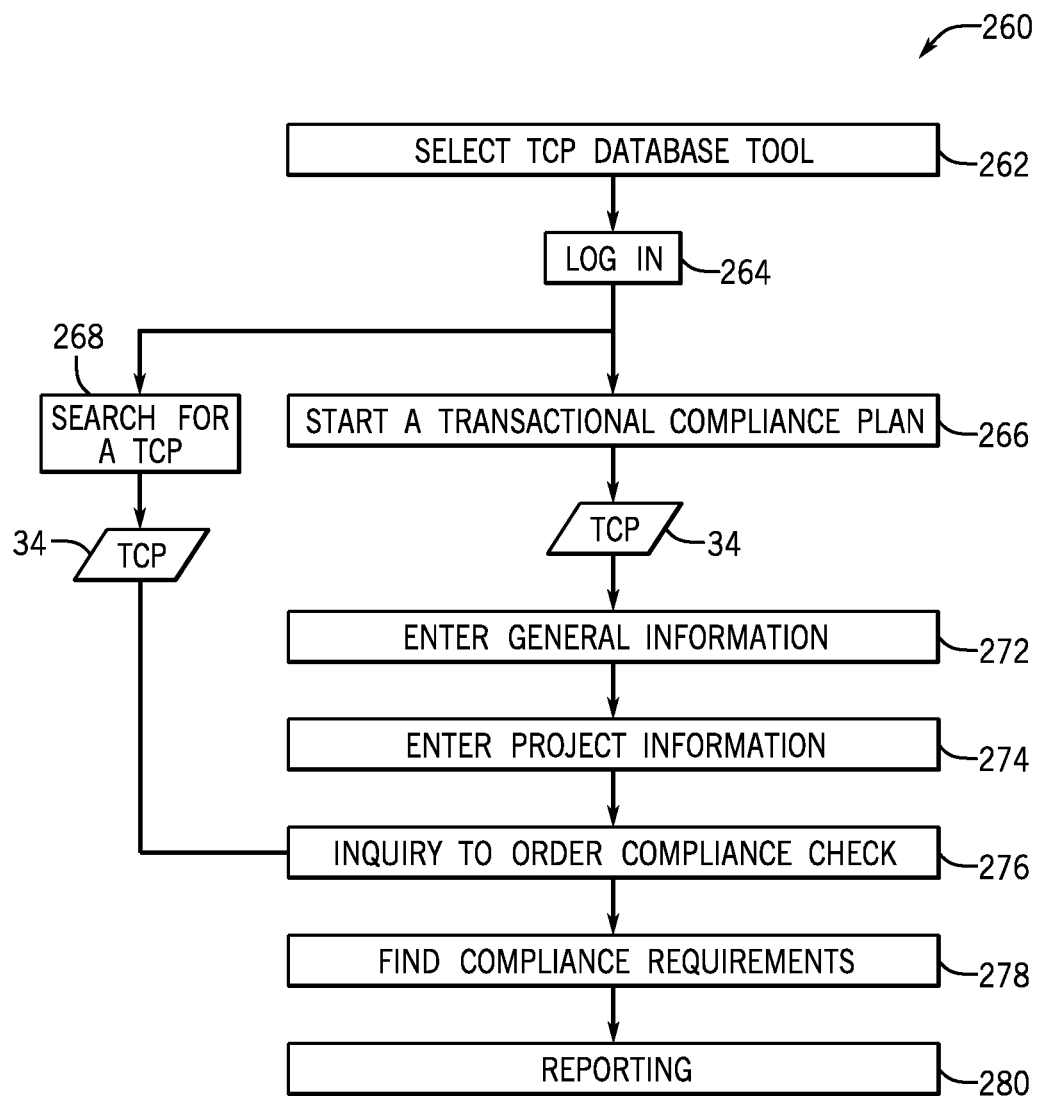
FIG. 15 is a flowchart of a process for a transactional compliance plan (TCP), in accordance with an embodiment.

FIG. 15 is a flow chart of a process 260 executable by the TCP tool 44, in accordance with an embodiment. The process 260 may be stored in memory as executable instructions and executed by one or more processors. The process 260 may begin by a user selecting the TCP tool 44 from the home screen 70 of the portal (block 262). The user may be prompted to log in to the TCP tool 44 (block 264). However, in embodiments where single sign-on is utilized and the user has previously logged into another tool, such as the PCE tool 40, the user may not be prompted to log in again. Once into the TCP tool 44, the user may start a TCP (block 266) or search for a TCP (block 268). If the user selects to start a TCP (block 266), then new TCP data 34 may be created and the user may be prompted to enter general information (block 272) and project information (block 274). This information may be saved for the TCP data 34 and an inquiry to order (ITO) compliance check may be performed by the TCP tool 44 (block 276) and follow-up actions may be suggested.

To perform the ITO compliance check, the TCP tool 44 may obtain the compliance requirements for the entered information by matching the entered information to the PCE data 30 and/or the PBCS data 32 (block 278). That is, the ITO compliance check may determine whether the entered information is compliant or not by comparing the entered information (e.g., TCP data 34) to the PCE data 30 and PBCS data 32 and matching whether the information meets the requirements. In some embodiments, the ITO compliance check may utilize string matching techniques such as fuzzy logic matching, regular expressions, or the like. Further, if the TCP data 34 for an order, which may include one or more products for one or more territories, is not compliant, a gap analysis may be performed. The gap analysis may identify the regulations that are not satisfied and project the cost and the cycle time to make the product compliant with those regulations. Thus, a sales team may utilize the projection to provide a quote to a customer who placed the order used in the ITO compliance check. Further, the compliance plan generated may be displayed in a report on a client's browser and/or it may be emailed to interested parties, such as an execution team and/or regulatory agency, or it may be printed (block 280).

If the user decides to search for saved TCP data 34 (block 268) after logging into the TCP tool 44, the user may do so by entering various information, including the business, project number, and/or shipped/archived project. The TCP server 24 may accept the search criteria inputs and generate commands to execute on the database 28. The commands may obtain the desired TCP data 34 and the ITO compliance check may be performed on the TCP data 34 (block 276), as described above. Further, the compliance requirements for the TCP data 34 may be accessed (block 278) from the PCE data 30 and the PBCS data 32 when matching whether the product(s) entered for the territory are compliant with the regulations. If the product(s) in the TCP data 34 are not compliant, the gap analysis may be performed to determine how to make the products compliant, how much it will cost, and how long it will take to make the products compliant. The compliance plan generated by the TCP tool 44 may be displayed in a report to the user, it may be emailed to interested parties, such as an execution team, or it may be printed (block 280). If the products in the order are compliant, the TCP tool 44 may send a report detailing the products in the order and how the products meet the regulations for a desired country to a regulatory agency in that country as proof of compliance.

Figure 16:
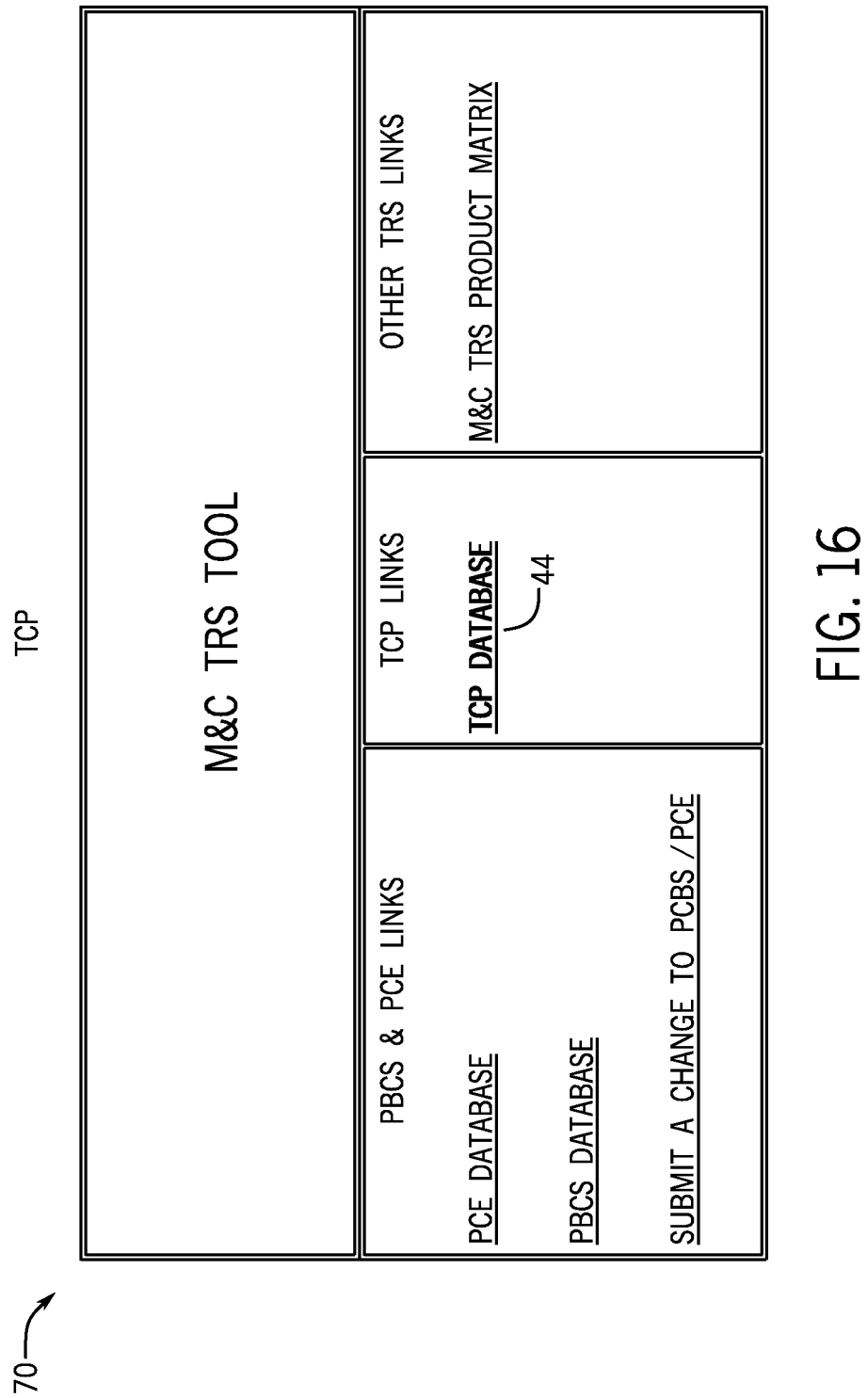
FIG. 16 illustrates a home screen for the product compliance fulfillment portal of FIG. 1 where the TCP tool is selected, in accordance with an embodiment.
Figure 17:
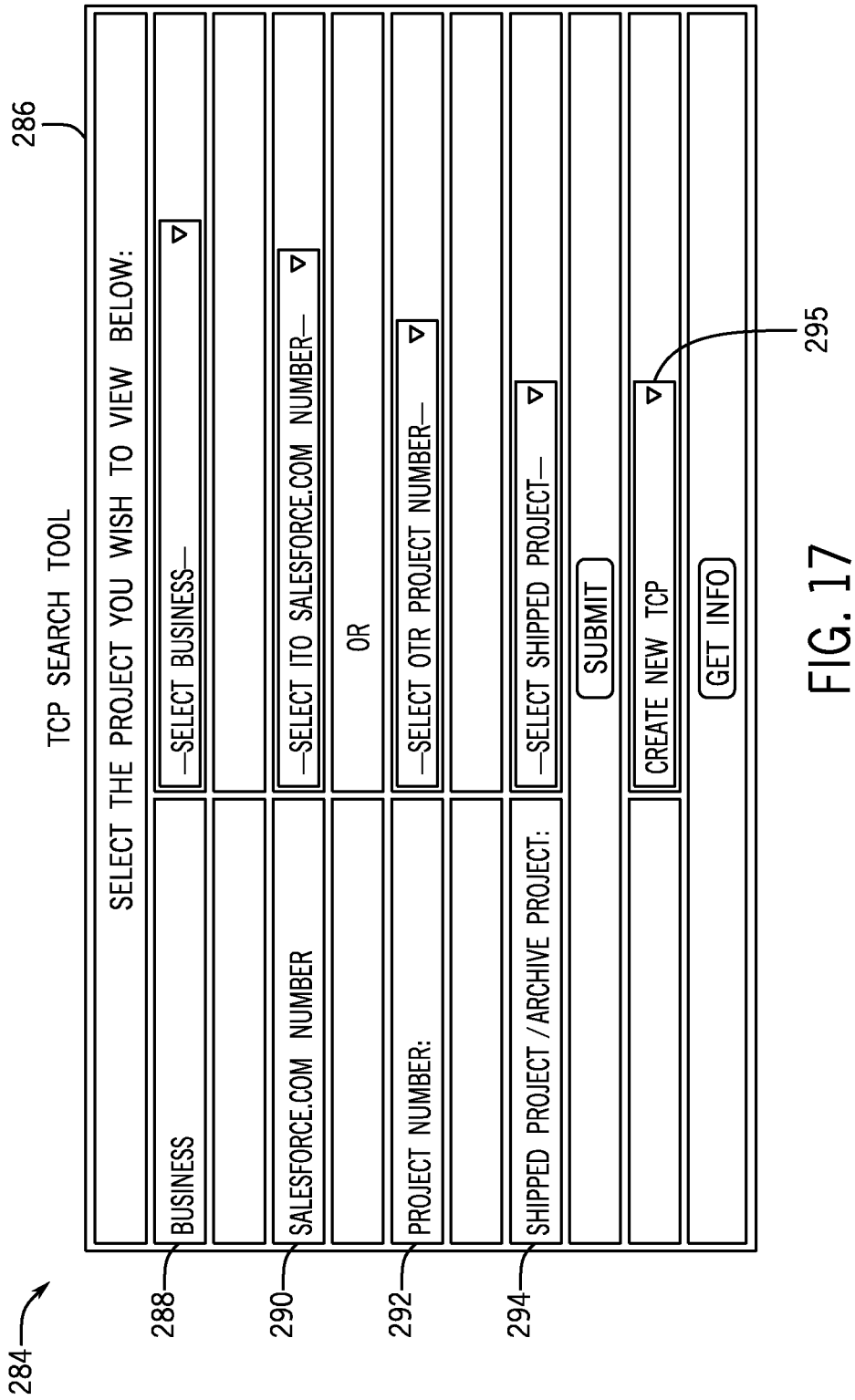
FIG. 17 illustrates a screen including a search tool and a creation tool provided by the TCP tool, in accordance with an embodiment.

To illustrate, FIGS. 16-22 show embodiments of various webpage screens displayed to the user throughout the TCP creation and compliance checking use case scenario described above. Specifically, FIG. 16 illustrates an embodiment of the home screen 70 for the product compliance fulfillment portal where the TCP tool 44 is selected (block 262 from FIG. 15). After the user selects the TCP tool 44 from the home screen 70, the user may be prompted by a log in screen to enter their credentials (block 264 from FIG. 15). In some embodiments, however, the user may not be prompted to log in if single sign-on is utilized. After selecting the TCP tool 44 and logging in, if applicable, the user may be directed to a screen 284 that may include an embodiment of a search tool and a creation tool 286 provided by the TCP tool 44, as illustrated in FIG. 17. The search tool may include search criteria for a business 288, a SalesForce.com number 290, a project number 292, a shipped project number 294, and so forth.

Figure 18:
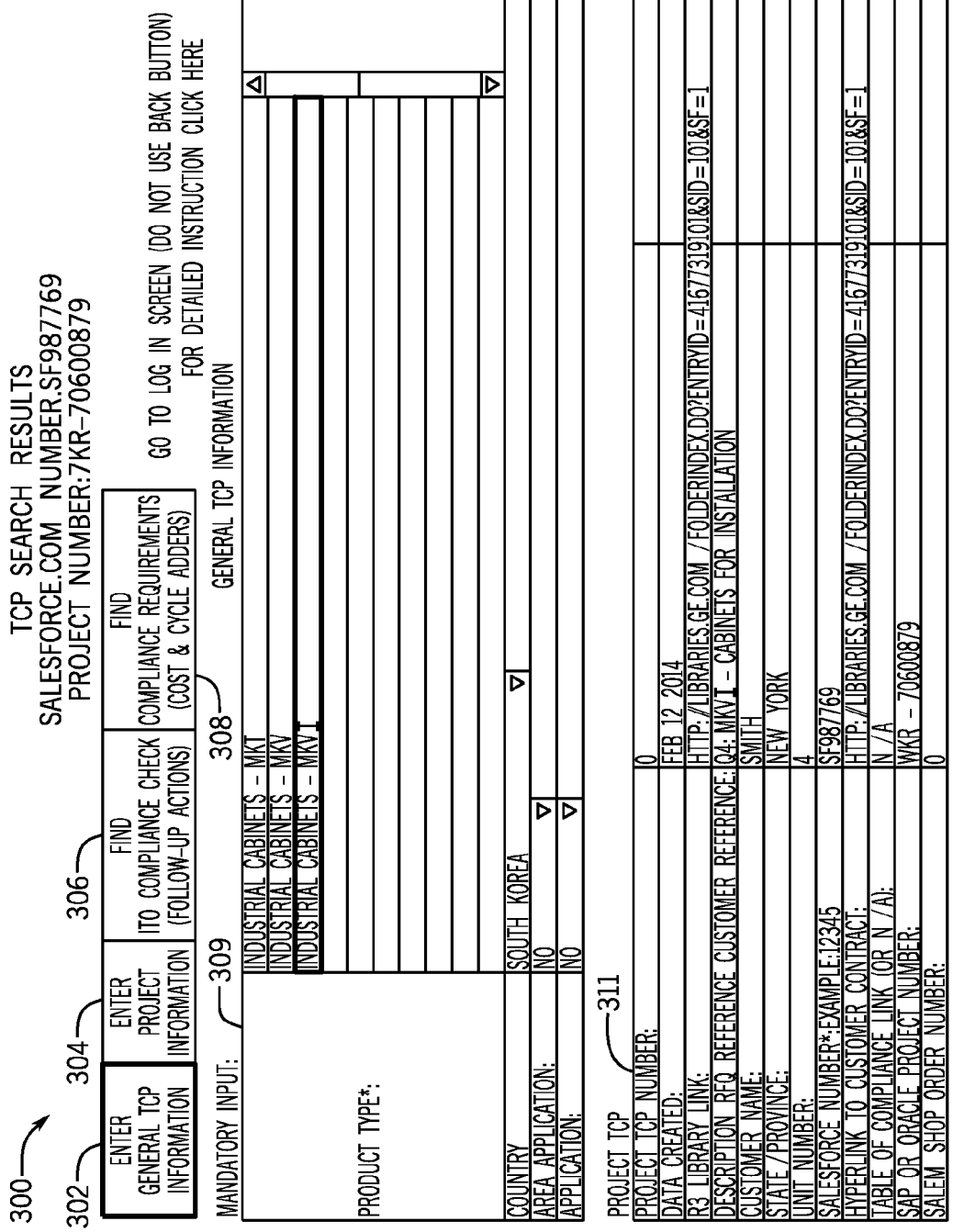
FIG. 18 illustrates a TCP information entry screen provided by the TCP tool where the general TCP information tab is selected, in accordance with an embodiment.

If the user selects to create a new TCP via a control 295, the user may be directed to a screen 300 including various tabs, as illustrated in FIG. 18. In the depicted embodiment, the tabs may provide options to the user to enter general TCP information 302, enter project information 304, find ITO compliance check 306, find compliance requirements 308, among others. By default, when creating a new TCP, the tab to enter general TCP information 302 may be selected. As depicted in the screen 300, the general TCP information may include some mandatory inputs 309, such as the product type, the territory (e.g., country, state, municipality, region), whether the product is a hazardous area application, and whether the product is a maritime application. Further, the user may enter additional general information 311, such as various order numbers (e.g., SalesForce.com number, SAP or Oracle Project Number), unit number(s), state/province, date created, and so forth. The user may save the general TCP information after it is properly entered.

Figure 19:
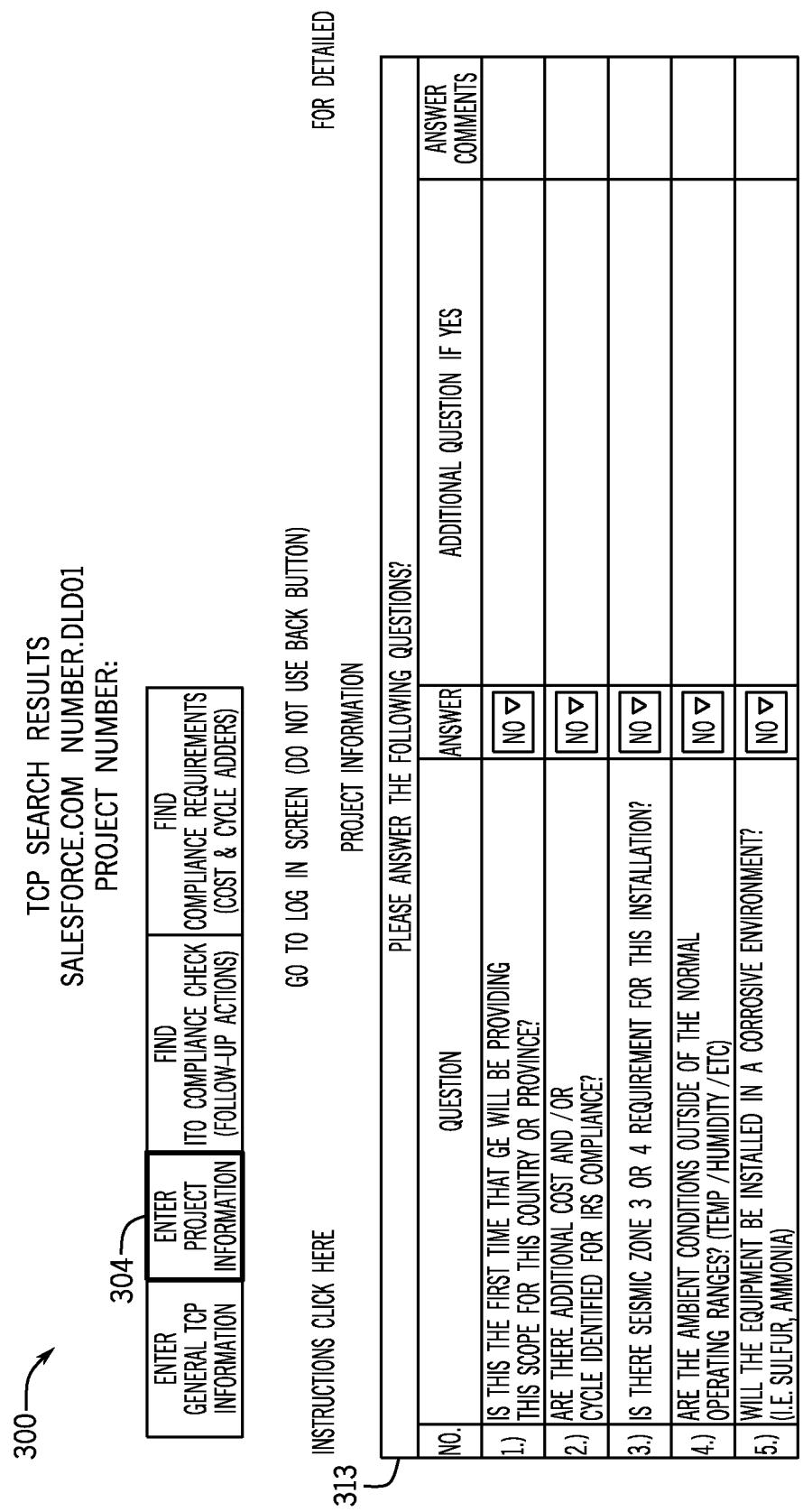
FIG. 19 illustrates a TCP information entry screen provided by the TCP tool where the project information tab is selected, in accordance with an embodiment.

FIG. 19 illustrates the screen 300 provided by the TCP tool 44 to enter TCP information where the enter project information tab 304 is selected, in accordance with an embodiment. The project information tab 304 may prompt the user with a number of questions 313 to answer regarding the project. If the user answers "yes" to any of the questions, then the user may be prompted to answer an additional question. Accordingly, the tabs 302, 304 may provide for a "wizard" type of input entry that enables a user to enter project information in a more user friendly manner and the techniques described herein may then use the entered information to more efficiently provide for product compliance checks, as well as actions suitable for rendering a product compliant.

Figure 20:
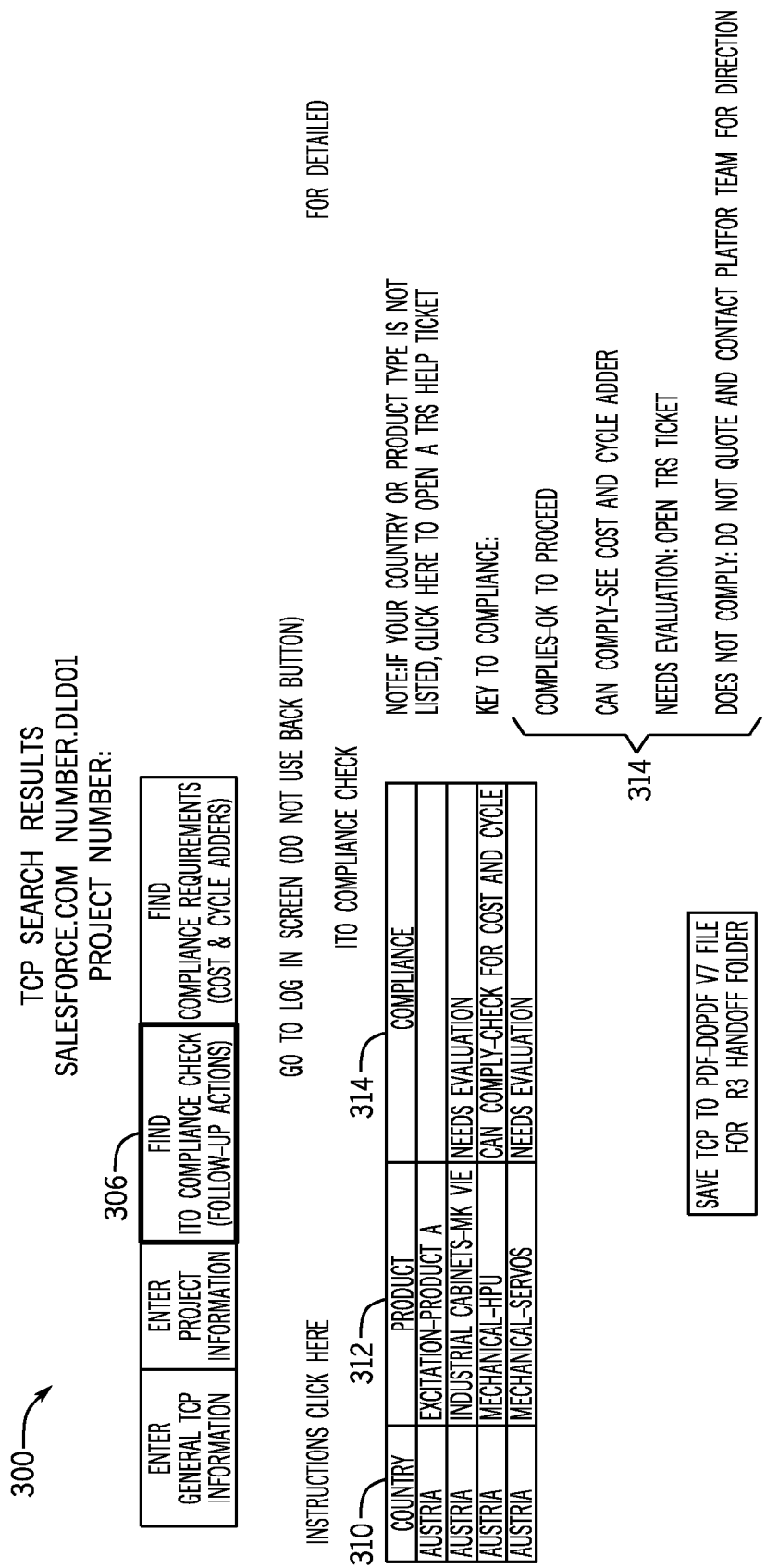
FIG. 20 illustrates a compliance checking tool screen provided by the TCP tool that may display suggested follow-up actions, in accordance with an embodiment.

FIG. 20 illustrates the screen 300 provided by the TCP tool 44 where the find ITO compliance check tab 306 is selected, in accordance with an embodiment. After the user has entered the general TCP information and the project information, the TCP tool 44 may direct the user to the find the ITO compliance check tab 306. If the user selected a product and country combination that was previously stored as PCE data 30 and/or PBCS data 32, then that information may be utilized by the TCP tool 44 to perform its ITO compliance check. For example, the ITO compliance check may include matching the entered product and country in the TCP tool 44 with the PCE data 30 and/or the PBCS data 32 and display whether the product meets the country's regulations by displaying the compliance status obtained by the PBCS tool 42. Thus, the ITO compliance check may display a graphical element including a country 310, a product 312, and a compliance status 314.

As previously mentioned, there may be four compliance statuses to indicate whether a product complies with a territory's requirements. The compliance statuses 314 may include "complies," "can comply—check for cost and cycle," "needs evaluation," and "does not comply." "Complies" may mean that it is ok to proceed with the project or accept the customer's order. "Can comply—check for cost and cycle" may mean that the product can comply but the user should check the cost and cycle time projections first. "Needs evaluation" may mean the product has not been evaluated for compliance in the selected territory and the user should open a help ticket so that the proper party may evaluate the product's compliance. "Does not comply" may mean that the product does not comply with the country's regulations, the user should not provide a quote for the customer's order, and the user should contact the proper party for direction.

FIG. 21 illustrates the screen 300 provided by the TCP tool 44 where the compliance requirement tab 308 is selected, in accordance with an embodiment. The compliance requirements may display the details specific to a product and a business needed to make that product compliant with the territory's compliance requirements. This information may provide for a gap analysis to let a sales person know whether a customer order can be fulfilled right away or whether work needs to be done to make the products in the order compliant for the desired territory. Additionally, the information will allow the sales person to let the customer know an estimated cost and an estimated time to make the products in the order compliant with the territory's regulations.

In the depicted embodiment, the screen 300 may utilize one or more graphical elements to display information relating to the country 310, a business 316, the compliance status 314, the product 312, a regulation category 318, a regulation 320, a plan of compliance 322, a regulation applicability 324, a standard 326, a cost to comply 328, a cycle to comply 330, comments to compliance 332, and so forth. The cost to comply 328 and cycle to comply 330 fields may display information when the compliance status is "can comply—check for cost and cycle." For example, the first row of the chart shows that a regulation requires the product undergo an inspection, so the cost to comply 328 may be calculated as the cost of the inspection (e.g., $15,000) and the cycle to comply 330 may include the days in between the scheduled inspection and the time it takes to perform the inspection (e.g., 5 days). The comments to compliance 332 information may have been entered previously in the PBCS tool 42. On the other hand, if a product's compliance status 314 is "complies," then the cost to comply may be $0 and the cycle to comply may be 0 weeks. It should be noted that the TCP data 34 may be saved at any time, emailed to a desired party, and/or printed.

As may be appreciated, performing an ITO compliance check may benefit the sales team by determining whether products requested by a customer are compliant with certain territory's regulations. And, performing a gap analysis to identify the products that are not compliant and calculating the cost and the cycle to make them compliant may enable the sales person to provide a quote and a timeframe for when the products may be compliant. In turn, this may inhibit the sales person from accepting orders that may not be fulfilled right away if the products requested are not compliant with regulations in the desired country.

Figure 22:
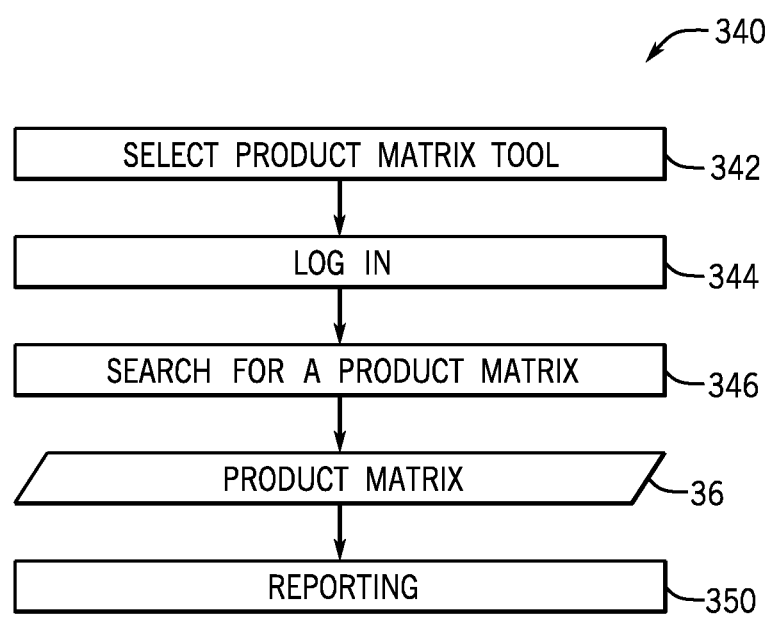
FIG. 22 is a flow chart of a process executable by a product matrix tool, in accordance with an embodiment.

FIG. 22 is a flowchart of a process 340 executable by the product matrix tool 46, in accordance with an embodiment. The process 340 may be implemented as executable instructions stored in memory and executed by one or more processors. The process 340 may begin by the user selecting the product matrix tool 46 from the home screen 70 of the portal (block 342). The user may be prompted to log in and enter their credentials (block 344). However, in other embodiments where single sign-on is utilized and the user has previously logged in during this session, the user may be directed to the product matrix tool 46. Once the user has access to the product matrix tool 46, the user may search for a product matrix (block 346) by entering certain search criteria. The product matrix server 26 may receive the request from the client's browser and generate commands to execute on the database 28 to obtain the desired product matrix data 36. Then, the product matrix server 26 may represent the product matrix data 36 in one or more graphical elements in a web page and display the web page on the client's browser (block 350) or otherwise present the matrix data 36.

Figure 23:
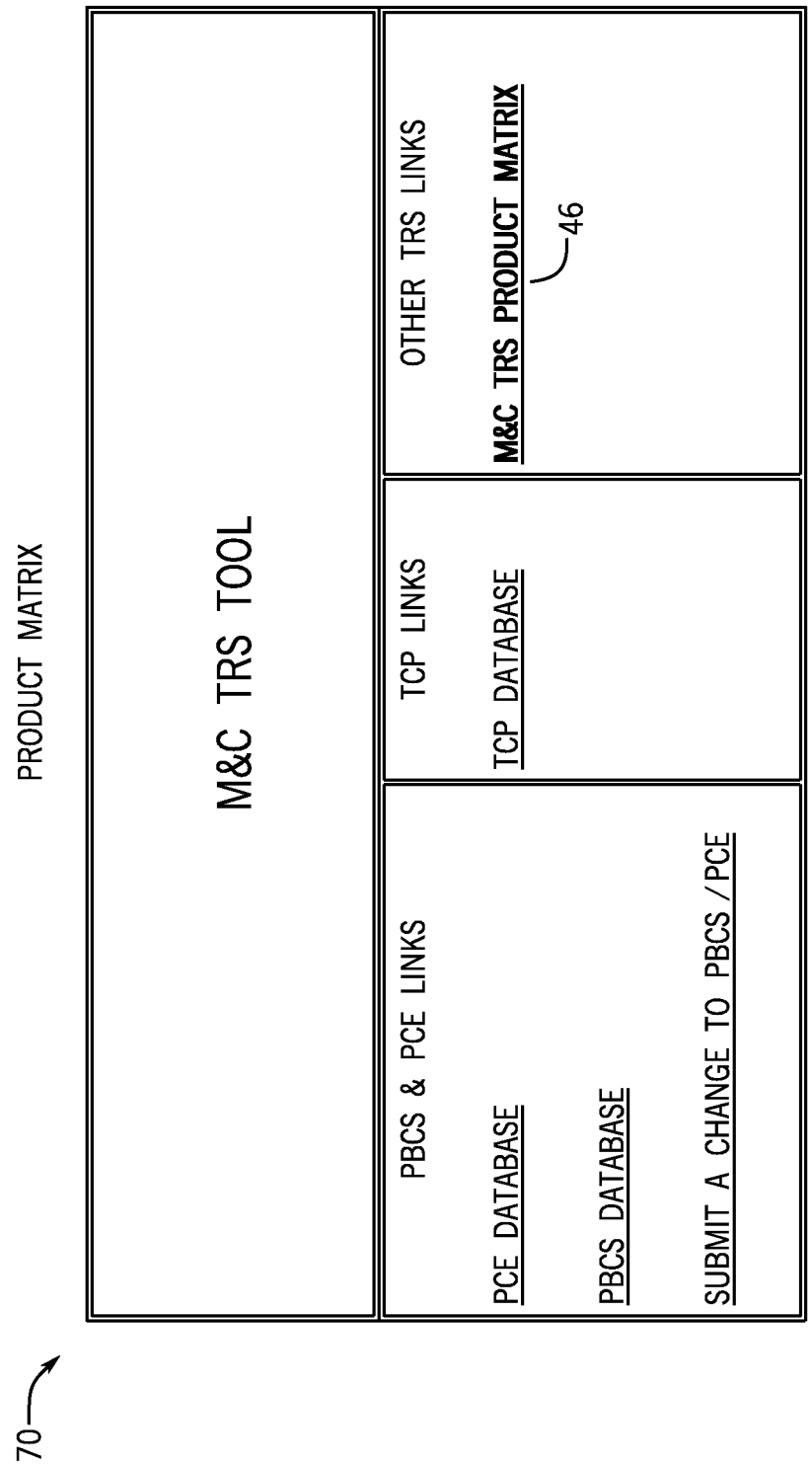
FIG. 23 illustrates a home screen for the product compliance fulfillment portal of FIG. 1 where the product matrix tool is selected, in accordance with an embodiment.
Figure 24:
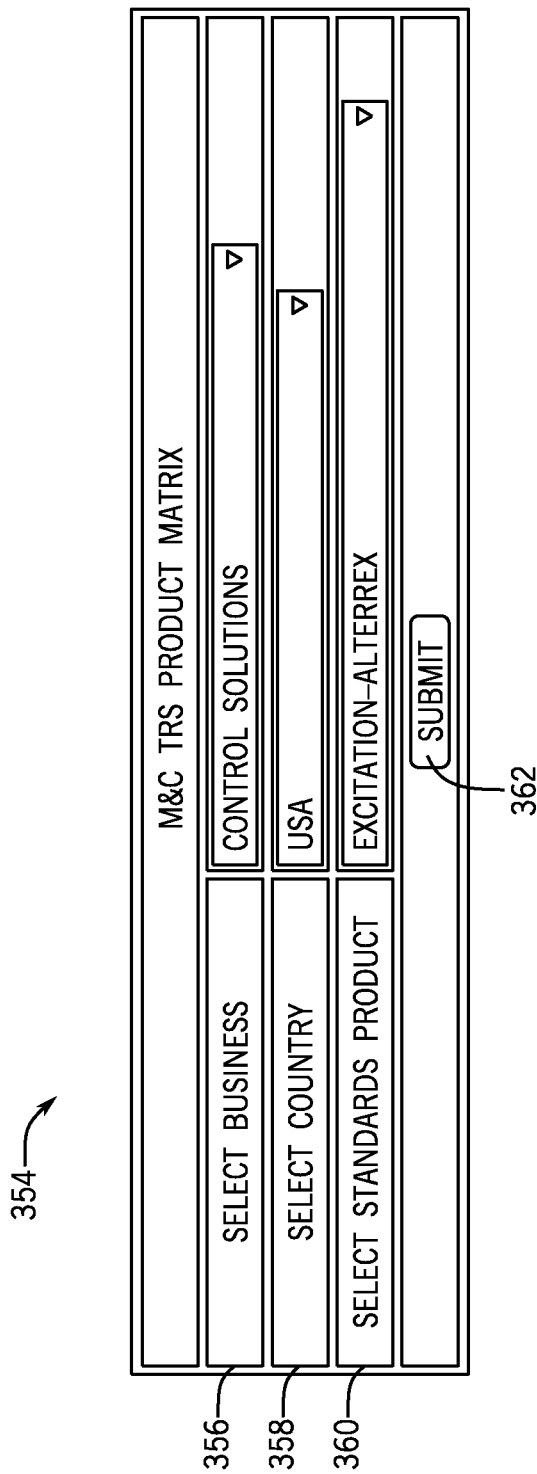
FIG. 24 illustrates a search tool screen provided by the product matrix tool, in accordance with an embodiment.

FIGS. 23-25 illustrate various webpage screens displayed to the user throughout the execution of the product matrix tool 46 as described above. Specifically, FIG. 23 illustrates the home screen 70 for the product compliance fulfillment portal where the product matrix tool 46 is selected (block 342 from FIG. 22). After the user selects the product matrix tool 46, the user may be directed to a search tool screen 354, as illustrated in FIG. 24. The search tool screen 354 may include a graphical element that provides search criteria, including a business 356, a country 358 or other territory, and a product 360. In the depicted search tool screen 354 the user has selected "Controls Solutions" for the business input 356, "USA" for the country input 358, and "Excitation—Product A" for the product input 360. When the user activates a "Submit" button 362, or any suitable search button, the product matrix tool 46 may display a search result screen 364 on the client browser, as illustrated in FIG. 25.

In the depicted embodiment, the search result screen 364 may include the selected business 356, country 358, and product 360 displayed at the top of the screen. The product matrix data 36 obtained by the search may be displayed in a graphical element such as a chart, graph, gridview, or the like. The product matrix data 36 may display information including regulations 366, standards 368, and compliance status 370. If a country or product type is not listed then the user may open a help ticket. Thus, a sales person may utilize this tool while communicating with a customer to check whether the products the customer requests are compliant with the regulations and standards in the desired country via more up to date data. It should be appreciated that the time saved by the sales person not having to retrieve information from different sources and determine whether the products are compliant may be significant and enable the sales person to respond to the customer's ITO much faster.

In another embodiment, the portal may provide quick search functionality to find expired regulations and standards and all of the products and project offerings that are affected. Additionally, a user may run a report to determine when regulations and standards are going to expire and the report may include the products that are affected. This may enable the user to know what products need to be retested and/or examined. Further, in some embodiments, whenever a regulation or standard expires, the businesses that work with the products and project offerings affected or any interested party may be automatically notified (e.g., emailed). As such, the business or interested party may update the regulation and/or standard to reflect that it is expired so that the regulation and/or standard is no longer taken into account when determining whether a product is compliant.

This written description uses examples to disclose the subject matter, including the best mode, and also to enable any person skilled in the art to practice the disclosed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory, computer-readable medium having instructions stored thereon, wherein the instructions are configured to cause a processor to:
   execute, via a server configured to communicate within a client-server network, a product compliance fulfillment portal, the product compliance fulfillment portal comprising a product compliance evaluation (PCE) tool, a product baseline compliance specification (PBCS) tool, and a transactional compliance plan (TCP) tool, wherein the PCE tool is configured to add compliance requirements for a product in a territory, wherein the compliance requirements comprise an engineering standard that the product must comply with to be sold in the territory;
   execute, via the server, the PBCS tool, wherein the PBCS tool is configured to identify compliance requirements for the product in the territory and to assign a compliance status in the territory;
   execute, via the server, the TCP tool, wherein the TCP tool is configured to receive a customer order incoming via a computing client communicatively coupled to the server, the customer order including the product and a desired territory as input, and to derive a compliance plan specifying first fulfillment instructions to fulfill the customer order with the product when the product comprises an identified compliant product and specifying second fulfillment instructions to fulfill the customer order with the product when the product comprises an identified non-compliant product;
   update the product compliance fulfillment portal with information and generate a signal to display a graphical representation of the information on a screen;
   generate automatically an indication of the information to transmit to a plurality of interested parties associated with the product compliance fulfillment portal; and upon executing the product compliance fulfillment portal, display on the screen a menu listing a plurality of tools including, at least, the PCE tool, the PBCS tool, and the TCP tool, and additionally display on the screen a link corresponding to each tool, each link being selectable to execute the respective tool directly from the menu.

2. The computer-readable medium of claim 1, further comprising instructions configured to automatically detect a change to a PCE data or a PBCS data and to trigger an alert to the plurality of interested parties if the change is detected.

3. The computer-readable medium of claim 2, further comprising instructions configured to continuously search the PCE data or the PBCS data via a search daemon, and wherein the change comprises an insert, update, delete, or expiration, and wherein the fulfillment instructions comprise computer-executable instructions suitable for execution via a second processor and configured to perform a gap analysis if a non-compliant product is detected, the gap analysis comprising specifying the compliance requirements for the product, calculating a cost to meet the compliance requirements, and calculating a cycle time to meet the compliance requirements.

4. The computer-readable medium of claim 1, further comprising instructions configured to generate the compliance plan specifying how to fulfill the customer order by retrieving data entered by the PCE tool and the PBCS tool and matching whether the product is compliant in the desired territory based upon the compliance status.

5. The computer-readable medium of claim 1 further comprising instructions configured to generate the compliance plan specifying how to fulfill the customer order by retrieving data entered by the PBCS tool that indicates how to make the product compliant in the desired territory, calculating a cost to make the product compliant, and calculating a cycle time to make the product compliant.

6. The computer-readable medium of claim 1, further comprising instructions configured to cause the TCP tool to perform a gap analysis if a non-compliant product in the customer order is detected, the gap analysis comprising specifying the compliance requirements for the product, a cost to meet the compliance requirements, and a cycle time to meet the compliance requirements.

7. The computer-readable medium of claim 1, further comprising instructions configured to cause the PCE tool, PBCS tool, and TCP tool to retrieve data based on search criteria comprising a product, a business, a territory, or some combination thereof.

8. The computer-readable medium of claim 1, further comprising instructions configured to store compliance requirements for the product in a database, wherein the product comprises a monitoring and protection device.

9. The computer-readable medium of claim 1, further comprising instructions configured to update the compliance requirements in the PCE tool and the PBCS tool by individual businesses of an entity.

10. The computer-readable medium of claim 1, further comprising instructions configured to execute a product matrix tool configured to generate a report specifying the product's compliance in the desired territory by business.

11. The computer-readable medium of claim 1, wherein the desired territory comprises a country, a state, a municipality, or a sales region.

12. A method, comprising:
adapting a product compliance server by uploading data relating to product compliance and product baseline compliance specifications into a database repository;
executing, via a processor included in the product compliance server, a product compliance fulfillment portal, the product compliance fulfillment portal comprising a product compliance evaluation (PCE) tool, a product baseline compliance specification (PBCS) tool, and a transactional compliance plan (TCP) tool, wherein the PCE tool is configured to add compliance requirements for a product in a territory;
executing, via the processor, the PBCS tool, wherein the PBCS tool is configured to identify compliance requirements for the product in the territory and assign a compliance status in the territory wherein the compliance requirements comprise an engineering standard that the product must comply with to be sold in the territory;
executing, via the processor, the TCP tool, wherein the TCP tool is configured receive a customer order incoming via a computing client communicatively coupled to the server, the customer order including the product and a desired territory as input, and to derive a compliance plan specifying first fulfillment instructions to fulfill the customer order with the product when the product comprises an identified compliant product and specifying second fulfillment instructions to fulfill the customer order with the product when the product comprises an identified non-compliant product;
updating the product compliance fulfillment portal with information and generating a signal to display a graphical representation of the information on a screen;
generating automatically an indication of the information to transmit to a plurality of interested parties associated with the product compliance fulfillment portal; and
upon executing the product compliance fulfillment portal, displaying on the screen a menu listing a plurality of tools including, at least, the PCE tool, the PBCS tool, and the TCP tool, and additionally displaying on the screen a link corresponding to each tool, each link being selectable to execute the respective tool directly from the menu.

13. The method of claim 12, comprising generating a compliance report if the customer order is compliant and transmitting the compliance report to an external entity in the desired territory.

14. The method of claim 12, wherein generating the compliance plan specifying how to fulfill the customer order comprises checking whether the product is compliant for the desired territory by retrieving data related to the product and the desired territory's regulations entered in the PCE tool and the PBCS tool and matching whether the product is compliant for the desired territory with the data.

15. The method of claim 12, comprising performing a gap analysis if the product is non-compliant in the desired territory by specifying how to make the non-compliant product compliant, how much it will cost to make the non-compliant product compliant, and a cycle time to make the non-compliant product compliant.

16. The method of claim 12, comprising detecting a change to a PCE data, a PBCS data, or a TCP data and triggering an alert to the plurality of interested parties if the change is detected.

17. The method of claim 12, comprising executing, via the processor, a product matrix tool configured to generate a report specifying the product's compliance in the desired territory by business.

18. A system, comprising:
a physical processor included in a product compliance server configured to:

execute a product compliance fulfillment portal, the product compliance fulfillment portal comprising a product compliance evaluation (PCE) tool, a product baseline compliance specification (PBCS) tool, and a transactional compliance plan (TCP) tool, wherein the PCE tool is configured to add compliance requirements for a product in a territory;

execute the PBCS tool, wherein the PBCS tool is configured to identify compliance requirements for the product in the territory and to assign a compliance status in the territory wherein the compliance requirements comprise an engineering standard that the product must comply with to be sold in the territory;

execute the TCP tool, wherein the TCP tool is configured to receive a customer order incoming via a computing client communicatively coupled to the server, the customer order including the product and a desired territory as input, and to derive a compliance plan specifying first fulfillment instructions to fulfill the customer order with the product when the product comprises an identified compliant product and specifying second fulfillment instructions to fulfill the customer order with the product when the product comprise an identified non-compliant product;

update the product compliance fulfillment portal with information and generate a signal to display a graphical representation of the information on a screen;

generate automatically an indication of the information to transmit to a plurality of entities associated with the product compliance fulfillment portal; and upon executing the product compliance fulfillment portal, display on the screen a menu listing a plurality of tools including, at least, the PCE tool, the PBCS tool, and the TCP tool, and additionally display on the screen a link corresponding to each tool, each link being selectable to execute the respective tool directly from the menu.

19. The system of claim 18, further comprising a second processor configured to execute a user client tool, the user client tool configured to receive and display web pages delivered by the product compliance fulfillment portal on a browser and to send requests to the PCE tool, the PBCS tool, and the TCP tool based upon user input.

20. The system of claim 18, wherein the physical processor is configured to transmit the compliance plan to a second system comprising a second physical processor located internally in an entity.

* * * * *